US011270692B2

(12) United States Patent
Hamada et al.

(10) Patent No.: US 11,270,692 B2
(45) Date of Patent: Mar. 8, 2022

(54) SPEECH RECOGNITION APPARATUS, SPEECH RECOGNITION PROGRAM, AND SPEECH RECOGNITION METHOD

(71) Applicant: FUJITSU LIMITED, Kawasaki (JP)

(72) Inventors: Yusuke Hamada, Ota (JP); Keisuke Asakura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 370 days.

(21) Appl. No.: 16/456,232

(22) Filed: Jun. 28, 2019

(65) Prior Publication Data

US 2020/0035226 A1 Jan. 30, 2020

(30) Foreign Application Priority Data

Jul. 27, 2018 (JP) ............................ JP2018-141325

(51) Int. Cl.
*G10L 15/18* (2013.01)
*G10L 15/10* (2006.01)

(52) U.S. Cl.
CPC .......... *G10L 15/1815* (2013.01); *G10L 15/10* (2013.01)

(58) Field of Classification Search
CPC ................. G10L 15/1815; G10L 15/10; G10L 2015/025; G10L 15/32
USPC ........................................................ 704/231
See application file for complete search history.

(56) References Cited

U.S. PATENT DOCUMENTS 8,521,526 B1 * 8/2013 Lloyd ..................... G10L 15/01 704/236
10,210,267 B1 * 2/2019 Lloyd ................. G06F 16/3344
11,003,839 B1 * 5/2021 Hatch .................... G06F 3/0482
2002/0032561 A1 * 3/2002 Ishikawa ............. G10L 15/1822 704/3
2005/0182558 A1 * 8/2005 Maruta .................. G01C 21/30 701/532
2006/0200350 A1 * 9/2006 Attwater ................. G10L 15/08 704/251
2009/0037179 A1 * 2/2009 Liu ......................... G10L 13/08 704/260
2010/0131277 A1 * 5/2010 Nakano ................... G10L 15/22 704/270
2011/0066437 A1 * 3/2011 Luff ....................... G06Q 30/02 704/254

(Continued)

FOREIGN PATENT DOCUMENTS

JP 08-166966 6/1996
JP 2007-524949 8/2007

(Continued)

*Primary Examiner* — Thuykhanh Le
(74) *Attorney, Agent, or Firm* — Fujitsu Patent Center

(57) ABSTRACT

A speech recognition method, performed by a computer, with an improved recognition accuracy is disclosed. The method includes: performing speech recognition of an input speech to acquire a plurality of recognition candidates through a plurality of speech recognition processes different from each other for a section having a reliability lower than a predetermined value; verifying similarities between each of the acquired plurality of recognition candidates and meta-information corresponding to the input speech; and determining, based on the verified similarities, a recognition result of the low-reliability section from among the acquired plurality of recognition candidates.

9 Claims, 24 Drawing Sheets

(56) References Cited

U.S. PATENT DOCUMENTS

2011/0067059 A1* 3/2011 Johnston ................. G10L 15/30
725/39
2011/0134321 A1* 6/2011 Berry ................... G11B 27/322
348/464
2011/0159921 A1* 6/2011 Davis ...................... G06F 3/167
455/556.1
2011/0166855 A1* 7/2011 Vermeulen .............. G10L 15/22
704/231
2012/0197629 A1* 8/2012 Nakamura .............. G10L 15/26
704/3
2012/0253823 A1* 10/2012 Schalk ............. G08G 1/096877
704/270.1
2013/0138437 A1* 5/2013 Cho ........................ G10L 15/20
704/233
2014/0207449 A1* 7/2014 Johnson ................. G11B 27/00
704/235
2014/0278360 A1* 9/2014 Clark ...................... G06F 16/40
704/9
2014/0297281 A1* 10/2014 Togawa .................. G10L 15/22
704/251
2014/0379337 A1* 12/2014 Pham ..................... H04N 5/278
704/235
2015/0003797 A1* 1/2015 Schmidt ............... G11B 27/031
386/201
2015/0019223 A1* 1/2015 Chen ..................... G06F 16/683
704/246
2015/0088501 A1* 3/2015 Recker .................... G10L 21/10
704/235
2015/0088508 A1* 3/2015 Bharadwaj ............ G10L 15/063
704/237
2015/0149169 A1* 5/2015 Chang .................... H04R 25/55
704/235
2016/0148616 A1* 5/2016 Takayanagi ............. G10L 15/32
704/235
2017/0041684 A1* 2/2017 Krishnamurthy ..... G06F 16/683
2017/0115954 A1* 4/2017 Innes .................... G06F 40/226
2017/0256262 A1* 9/2017 Ramachandra ......... G10L 15/26
2017/0289341 A1* 10/2017 Rodriguez ......... G06K 9/00335
2018/0040325 A1* 2/2018 Melanson ............... G10L 17/00
2018/0158450 A1* 6/2018 Tokiwa ................... G10L 25/57
2019/0013018 A1* 1/2019 Rekstad .................... G06F 3/16
2019/0163437 A1* 5/2019 Nagasaka ............... G10L 15/22
2019/0273767 A1* 9/2019 Nelson .................. H04L 65/403
2019/0341054 A1* 11/2019 Krupka ................... G10L 17/00
2020/0074993 A1* 3/2020 Lee ......................... G06F 40/30

FOREIGN PATENT DOCUMENTS

JP 2012-078650 4/2012
WO 2005/077098 8/2005

* cited by examiner

本日は所により雨、
コース確立は…
(MEANING "TODAY, WE'LL HAVE SCATTERED SHOWERS. THE COURSE ESTABLISHMENT IS…."
THE TERMS "PROBABILITY" AND "ESTABLISHMENT" IN JAPANESE ARE BOTH PRONOUNCED AS "KAKURITSU").

CONTEXT MODEL

SPEECH RECOGNITION ENGINE ⌐21b

| 本日 | は | 所 | に | より | 雨 | コース | 確立 | は |
|------|-----|-----|-----|------|-----|--------|------|-----|
| 98%  | 80% | 90% | 78% | 99%  | 80% | 20%    | 25%  | 72% |

⌐21c

| TIME | RECOGNITION RESULT | RELIABILITY |
|------|--------------------|-----|
| 00:00:00 – 00:00:02 | 本日 | 98% |
| 00:00:02 – 00:00:03 | は | 80% |
| 00:00:03 – 00:00:05 | 所 | 90% |
| 00:00:05 – 00:00:06 | に | 78% |
| 00:00:06 – 00:00:07 | より | 99% |
| 00:00:07 – 00:00:08 | 雨 | 80% |
| 00:00:08 – 00:00:10 | コース | 20% |
| 00:00:10 – 00:00:12 | 確立 | 25% |
| 00:00:12 – 00:00:13 | は | 72% |

| TEXT CANDIDATE | CONSISTENCY |
| --- | --- |
| 1. 本日は所により雨、 コース確立 は…<br>(MEANING "TODAY, WE'LL HAVE SCATTERED SHOWERS. THE COURSE ESTABLISHMENT IS...." THE TERMS "PROBABILITY" AND "ESTABLISHMENT" IN JAPANESE ARE BOTH PRONOUNCED AS "KAKURITSU"). | 40% |
| 2. 本日は所により雨、 国立 は…<br>(MEANING "TODAY, WE'LL HAVE SCATTERED SHOWERS. THE NATIONAL IS...." THE TERM "NATIONAL" IS PRONOUNCED AS "KOKURITSU" IN JAPANESE). | 20% |
| 3. 本日は所により雨、 降水確率 は…<br>(MEANING "TODAY, WE'LL HAVE SCATTERED SHOWERS. THE PRECIPITATION PROBABILITY IS..."). | 90% |
| 4. 本日は所により雨、 香水確立 は…<br>(MEANING "TODAY, WE'LL HAVE SCATTERED SHOWERS. THE PERFUME ESTABLISHMENT IS...." THE TERM "PERFUME" IN JAPANESE IS ALSO PRONOUNCED AS "KOUSUI"). | 30% |
| 5. 本日は所により雨、 越す確率 は…<br>(MEANING "TODAY, WE'LL HAVE SCATTERED SHOWERS. THE EXCESSING PROBABILITY IS...." THE TERM "EXCESSING" IN JAPANESE IS PRONOUNCED AS "KOSU"). | 50% |

本日は所により雨、
越す確率は…
(MEANING "TODAY, WE'LL HAVE SCATTERED SHOWERS. THE EXCESSING PROBABILITY IS...")

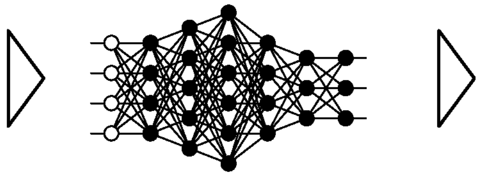

CONTEXT MODEL

50%

SPEECH RECOGNITION APPARATUS, SPEECH RECOGNITION PROGRAM, AND SPEECH RECOGNITION METHOD

CROSS-REFERENCE TO RELATED APPLICATION

This application is based upon and claims the benefit of priority of the prior Japanese Patent Application No. 2018-141325, filed on Jul. 27, 2018, the entire contents of which are incorporated herein by reference.

FIELD

The embodiment discussed herein is related to a speech recognition apparatus, a speech recognition program, and a speech recognition method.

BACKGROUND

As a technology to transcribe the words of someone's speech into characters, there has heretofore been speech recognition process to convert an inputted speech into a text. As for this speech recognition process, when words in the text include one having low reliability, a conventional technology has been known to correct the text by predictive transform based on a character string including one or more words with high reliability included in the text.

Related techniques are disclosed in, for example, Japanese Laid-open Patent Publication Nos. 2012-78650 and 8-166966 and Japanese National Publication of International Patent Application No. 2007-524949. However, in the above conventional technology, there is a case where the text correction by the predictive transform is not appropriate in terms of context or text as a whole. As a result, there is a problem of a poor recognition rate.

According to one aspect, it is an object of the disclosure to provide a speech recognition apparatus, a speech recognition program, and a speech recognition method, which are capable of improving speech recognition accuracy.

SUMMARY

According to an aspect of the embodiments, a speech recognition method, performed by a computer, with an improved recognition accuracy is disclosed. The method includes: performing speech recognition of an input speech to acquire a plurality of recognition candidates through a plurality of speech recognition processes different from each other for a section having a reliability lower than a predetermined value; verifying similarities between each of the acquired plurality of recognition candidates and meta-information corresponding to the input speech; and determining, based on the verified similarities, a recognition result of the low-reliability section from among the acquired plurality of recognition candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10B is an explanatory diagram explaining consistency check;

DESCRIPTION OF EMBODIMENTS

Figure 1:
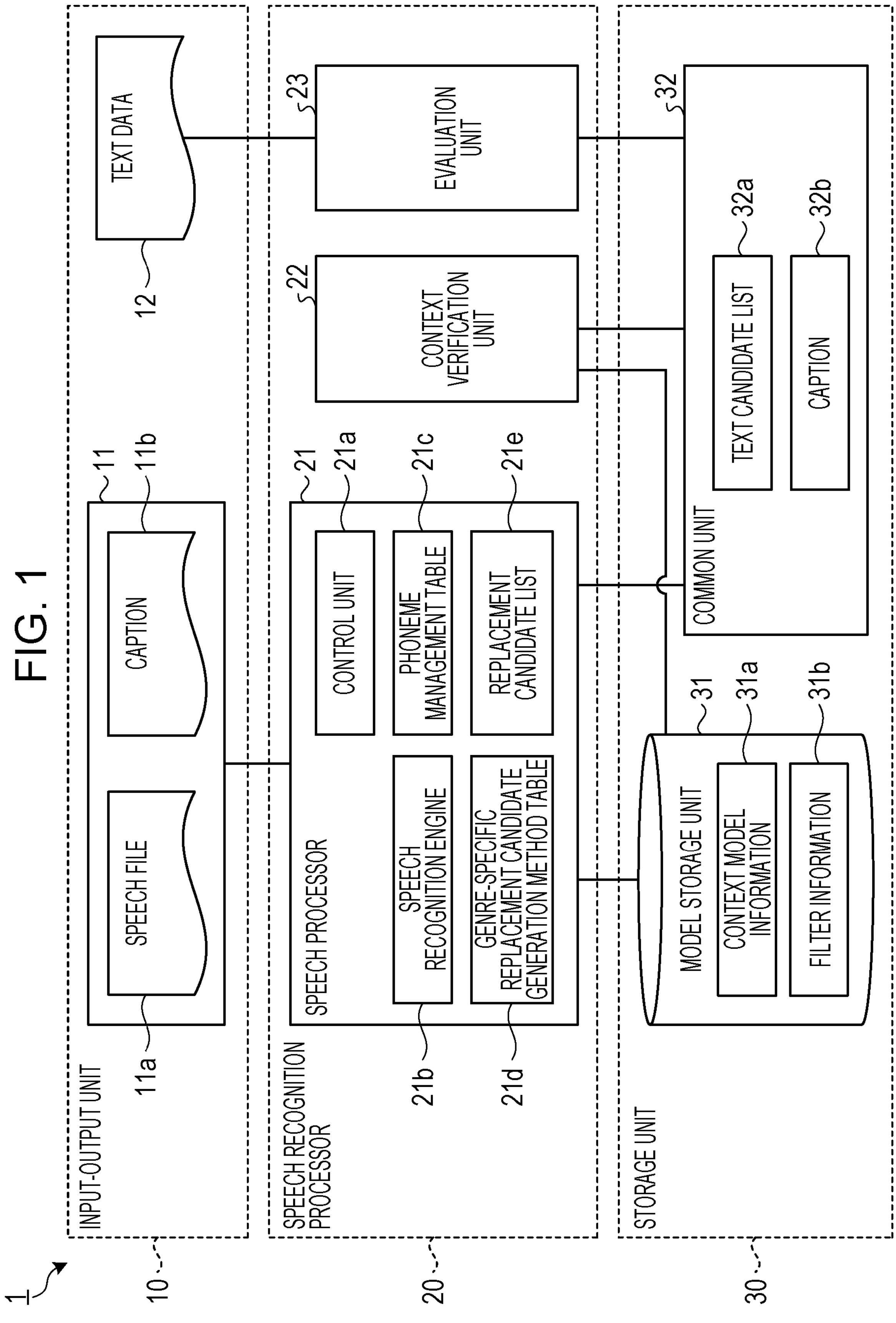
FIG. 1 is a block diagram illustrating a functional configuration example of a speech recognition apparatus according to an embodiment.

Hereinafter, with reference to the drawings, description is given of a speech recognition apparatus, a speech recognition program, and a speech recognition method according to an embodiment. In this embodiment, constituent components having the same functions are denoted by the same reference numerals, and repetitive description thereof is omitted. The speech recognition apparatus, the speech recognition program, and the speech recognition method described in the following embodiment are merely an example and not intended to limit the embodiment. The respective embodiments may be combined as appropriate without causing any inconsistency.

FIG. 1 is a block diagram illustrating a functional configuration example of the speech recognition apparatus according to the embodiment. As illustrated in FIG. 1, a speech recognition apparatus 1 is an information processor that receives input of input data 11 including a speech file 11*a* and a caption 11*b* corresponding to the speech file 11*a*, and outputs, as text data 12, a speech recognition result obtained by converting a speech into a text. For example, a personal computer (PC) or the like is applicable as the speech recognition apparatus 1.

For example, the speech recognition apparatus 1 includes an input-output unit 10, a speech recognition processor 20, and a storage unit 30.

The input-output unit 10 is a processing unit that performs input and output of files, display output of data to a display, and the like. For example, the input-output unit 10 receives input of the input data 11 associated with speech recognition. The input data 11 includes the speech file 11*a* and the caption 11*b*. The speech file 11*a* is a file including speech data to be subjected to speech recognition.

The caption 11*b* is text data indicating speech content in the speech file 11*a*, and is, for example, an introductory sentence having content introduced with speech. For example, the caption 11*b* is an example of meta-information corresponding to input speech. In this embodiment, description is given of the caption 11*b* as an example of the meta-information. However, the meta-information is not only the caption 11*b* but may also be a telop (i.e., text superimposed on a screen) sentence or the like in a moving image corresponding to the speech file 11*a*, for example.

The speech recognition processor 20 performs speech recognition for the speech file 11*a* received by the input-output unit 10, and outputs a recognition result as the text data 12. For example, the speech recognition processor 20 includes a speech processor 21, a context verification unit 22, and an evaluation unit 23.

The speech processor 21 includes a control unit 21*a*, a speech recognition engine 21*b*, a phoneme management table 21*c*, a genre-specific replacement candidate generation method table 21*d*, and a replacement candidate list 21*e*.

The control unit 21*a* controls speech recognition process by the speech processor 21. For example, the control unit 21*a* uses the speech recognition engine 21*b* to perform speech recognition for the input speech. The control unit 21*a* uses the speech recognition engine 21*b* to perform a plurality of speech recognition processes different from each other for a section having a reliability lower than a predetermined value in the recognition result, based on the genre-specific replacement candidate generation method table 21*d*, for re-recognition, thereby acquiring a plurality of recognition candidates (words and the like). The control unit 21*a* saves the plurality of recognition candidates thus acquired in the replacement candidate list 21*e*.

The control unit 21*a* generates a text candidate list by embedding the plurality of recognition candidates (words and the like) described in the replacement candidate list 21*e* for the low-reliability section, and stores the generated list as a text candidate list 32*a* in a common unit 32. The control unit 21*a* also stores the caption 11*b* corresponding to the speech file 11*a* as a caption 32*b* in the common unit 32.

The speech recognition engine 21*b* recognizes phonemes uttered by a person or the like, that is, a word (reading) uttered by a person to be recognized from a speech waveform in the speech file 11*a*. The speech recognition engine 21*b* enters a word having the reading close to the recognized reading in a word group in its internal word dictionary, as a recognition result together with the time of the speech, in the phoneme management table 21*c*.

The phoneme management table 21*c* is a data table or the like that manages, with time, the phonemes recognized by the speech recognition engine 21*b*. The genre-specific replacement candidate generation method table 21*d* is a data table or the like in which methods for re-recognizing the low-reliability section in the plurality of speech recognition processes are described for each process. The replacement candidate list 21*e* is a data table or the like in which a list of the plurality of recognition candidates (replacement candidates) acquired by the re-recognition is described for the low-reliability section.

The context verification unit 22 refers to the text candidate list 32*a* and uses a context model learned with a deep learning method to verify a similarity between the plurality of recognition candidates acquired by the speech processor 21 and the caption 32*b* that is the meta-information corresponding to the speech file 11*a*. For example, the context verification unit 22 uses a technology such as doc2vec using the deep learning method to vectorize the text and caption 11*b* including the plurality of recognition candidates. For the text and caption 11*b* including the plurality of recognition candidates, the context verification unit 22 obtains a similarity by comparing context vectors obtained by vectorizing characteristics of the text. For example, the context verification unit 22 is an example of a verification unit.

The context verification unit 22 also refers to the text candidate list 32*a* having the plurality of recognition candidates embedded therein and uses a technology such as doc2vec to vectorize the preceding and following context including the embedded portion. The context verification unit 22 verifies the consistency of the preceding and following context by comparing the generated vectors.

Based on the verification result from the context verification unit 22, the evaluation unit 23 determines a recognition result from among the plurality of recognition candidates acquired by the speech processor 21 for the section having low reliability of speech recognition. For example, based on the similarity with the caption 11*b*, the evaluation unit 23 determines one having the highest similarity in the text candidate list 32*a*, for example, as the recognition result. Based on the consistency of the preceding and following context in the text candidate list 32*a*, the evaluation unit 23 also determines one having the highest consistency in the text candidate list 32*a*, for example, as the recognition result. The recognition results determined by the evaluation unit 23 are outputted as the text data 12 indicating the speech recognition result of the speech file 11*a* by the input-output unit 10.

The storage unit 30 is, for example, a storage device such as a hard disk drive (HDD) and includes a model storage unit 31 and the common unit 32. The model storage unit 31 stores context model information 31*a* and filter information 31*b*. The common unit 32 stores the text candidate list 32*a* and the caption 32*b*.

The context model information 31*a* includes various parameters and the like for building a neural network for a learned context model. The filter information 31*b* includes various parameters and the like associated with a speech filter to be used for speech recognition process by the speech recognition engine 21*b*.

Figure 2:
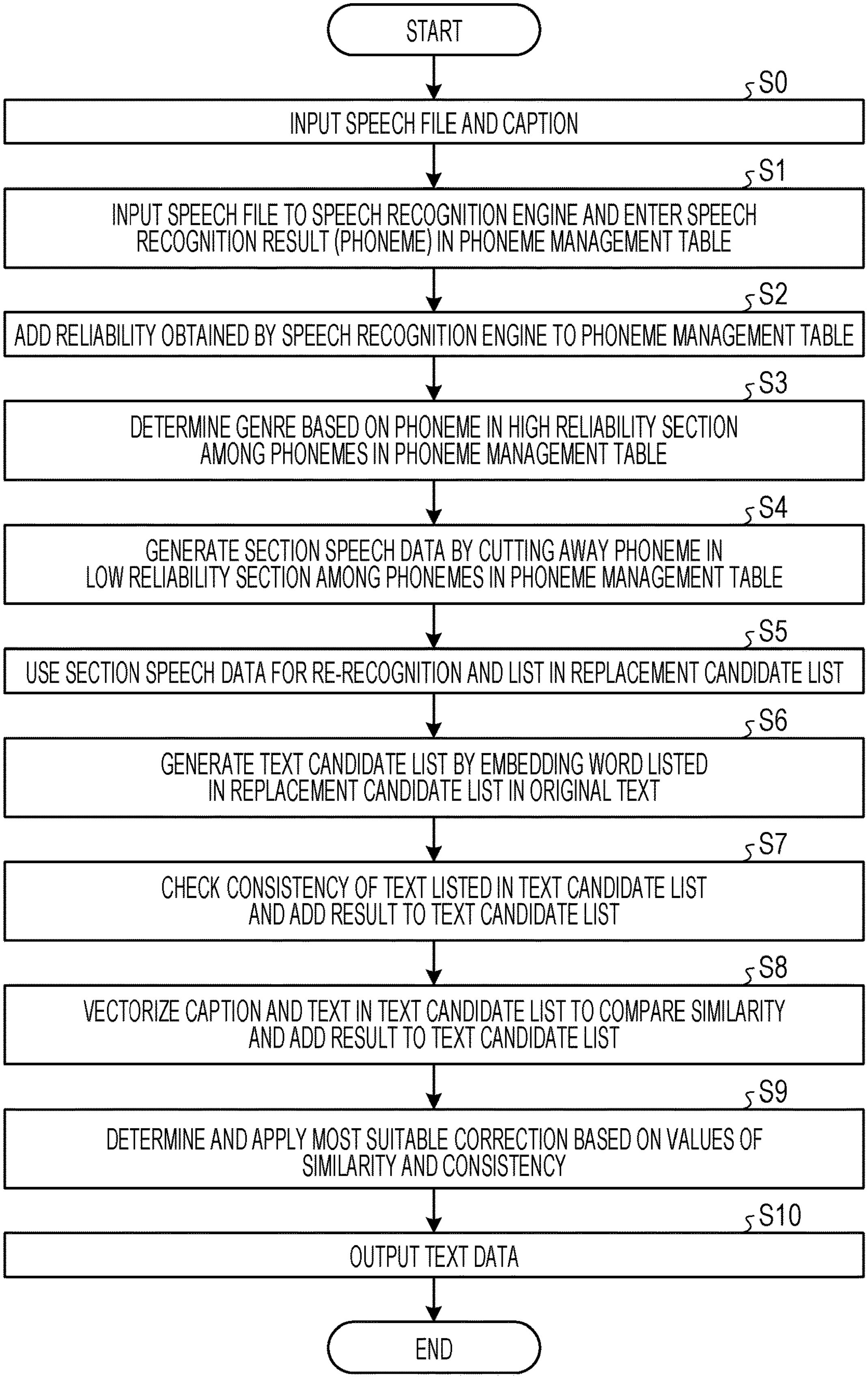
FIG. 2 is a flowchart illustrating an operation example of the speech recognition apparatus according to the embodiment.
Figure 3A:
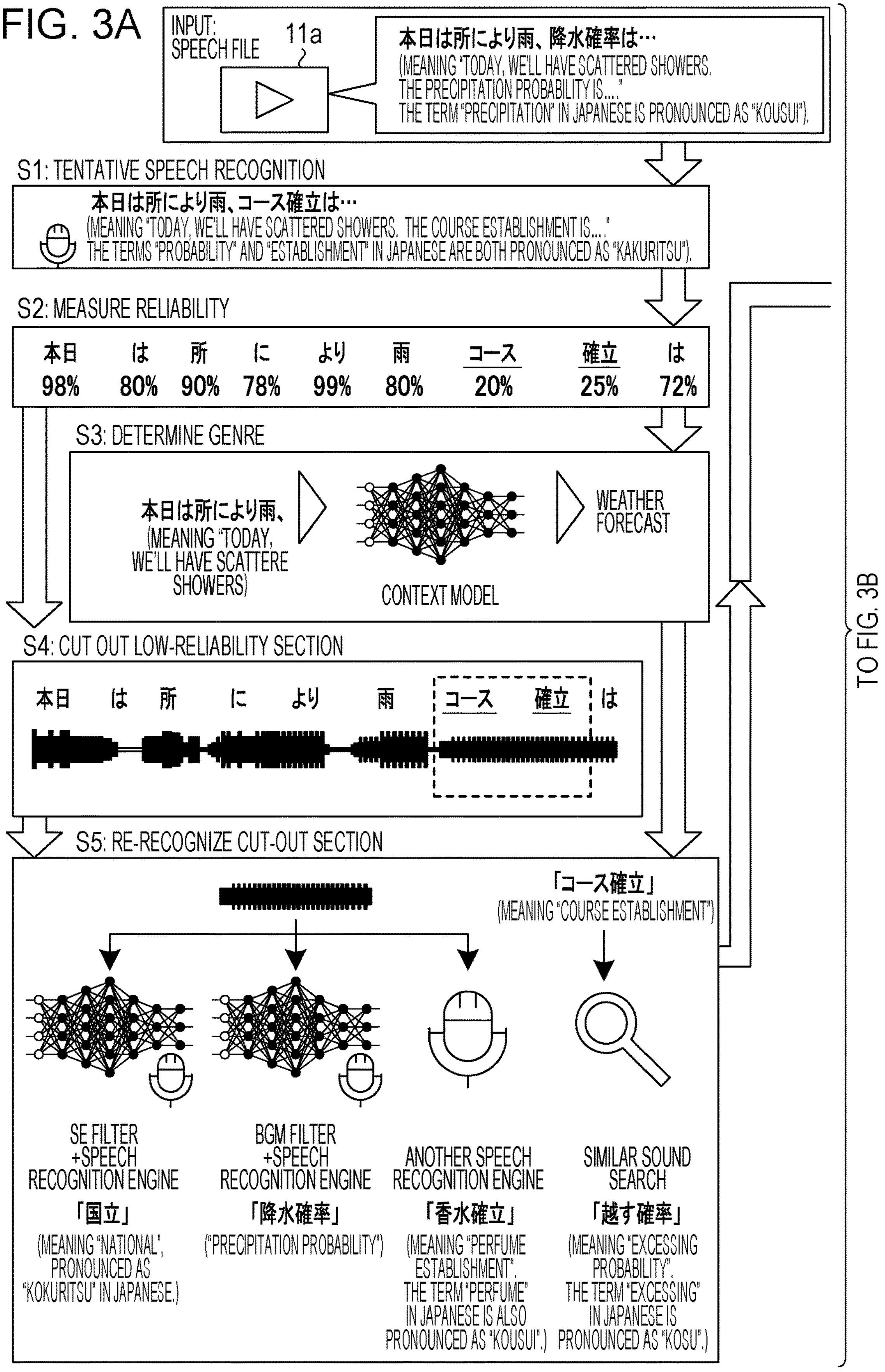
FIGS. 3A to 3C are explanatory diagrams illustrating an outline of operations performed by the speech recognition apparatus according to the embodiment.
Figure 3B:
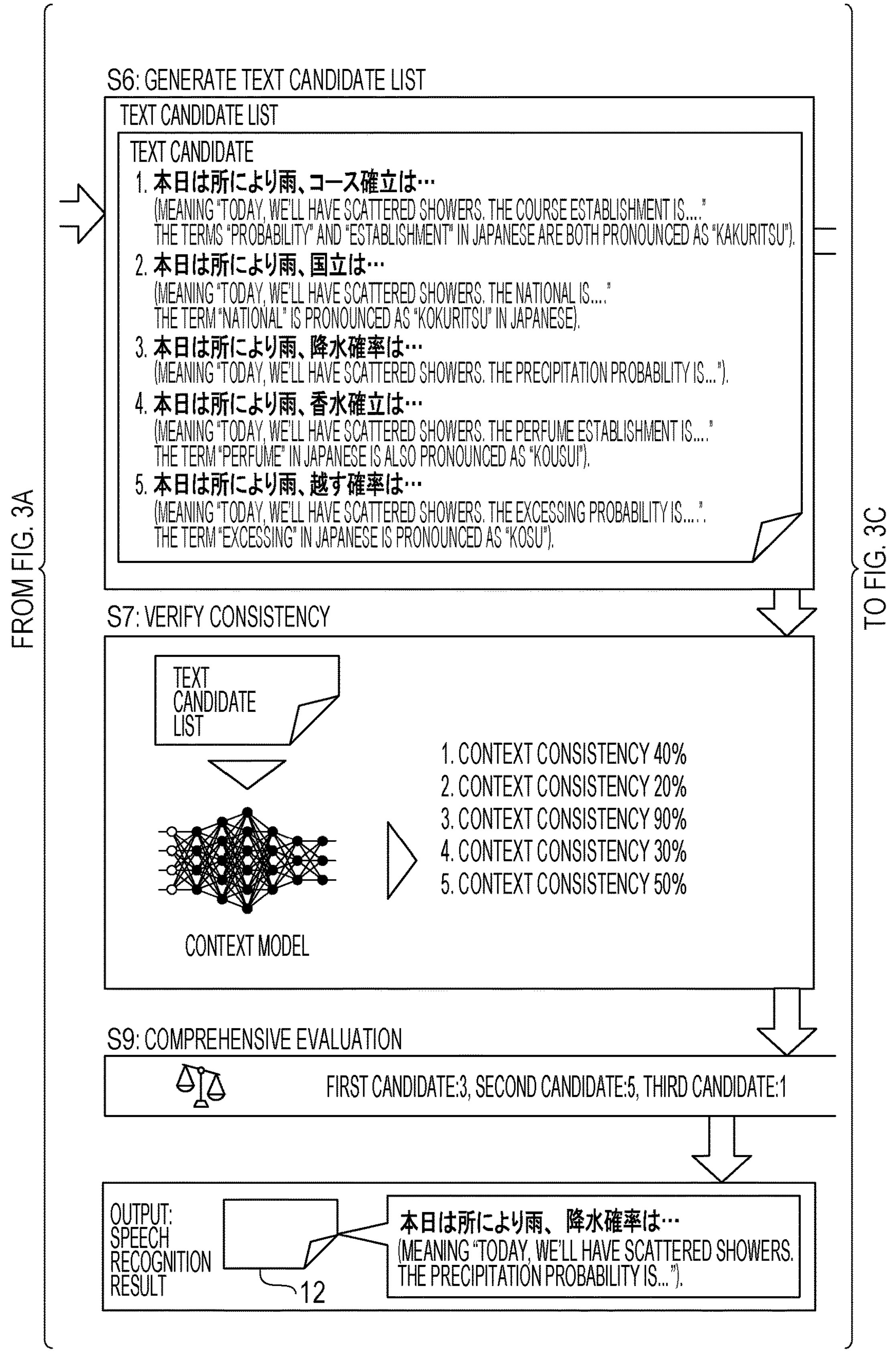
Figure 3C:
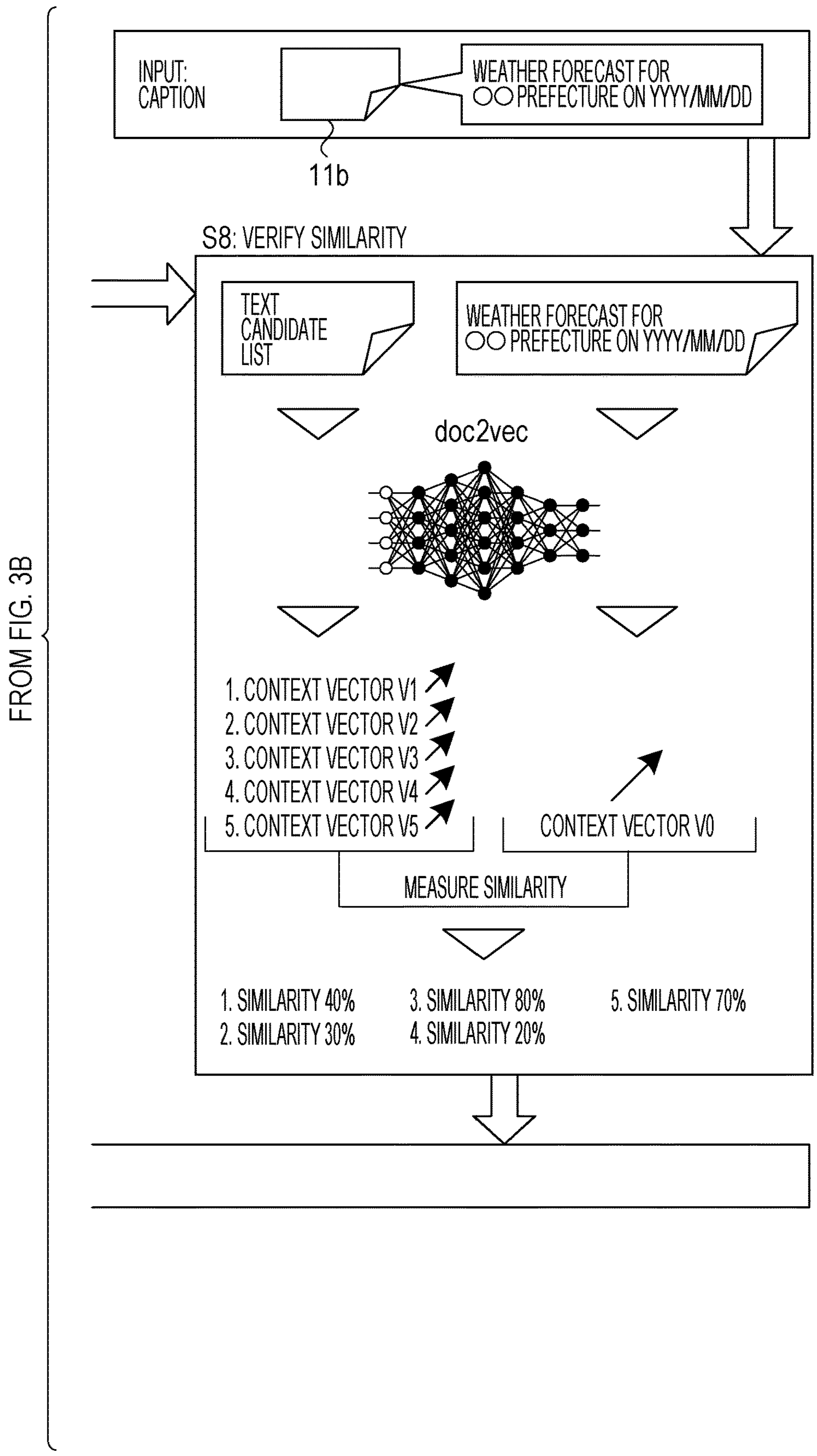

FIG. 2 is a flowchart illustrating an operation example of the speech recognition apparatus 1 according to the embodiment. FIGS. 3A to 3C are explanatory diagrams illustrating an outline of operations performed by the speech recognition apparatus 1 according to the embodiment, for example, an outline of respective processes (S1 to S9) in FIG. 2.

As illustrated in FIG. 2, once processing is started, the input-output unit 10 receives input of input data 11 (speech file 11*a* and caption 11*b*) to be subjected to speech recognition (S0). As illustrated in FIG. 3A, for example, the control unit 21*a* receives input of a speech file 11*a* of 本日は所により雨，降水確率は . . . 」(meaning "Today, we'll have scattered showers. The precipitation probability is . . . ". The term "precipitation" in Japanese is pronounced as "kousui").

Next, the control unit 21*a* in the speech processor 21 inputs the inputted speech file 11*a* to the speech recognition engine 21*b* and enters a speech recognition result (phonemes) in the phoneme management table 21*c* (S1).

As illustrated in FIG. 3A, for example, the control unit 21*a* obtains a tentative speech recognition result of 「本日は所により雨，コース確立は . . . 」(meaning "Today, we'll have scattered showers. The course establishment is . . . ". The terms "probability" and "establishment" in Japanese are both pronounced as "kakuritsu") by inputting the speech file 11*a* of 「本日は所により雨，降水確率は . . . 」(meaning "Today, we'll have scattered showers. The precipitation probability is . . . ") to the speech recognition engine 21*b*. This speech recognition result is entered in the phoneme management table 21*c*.

Figure 4:
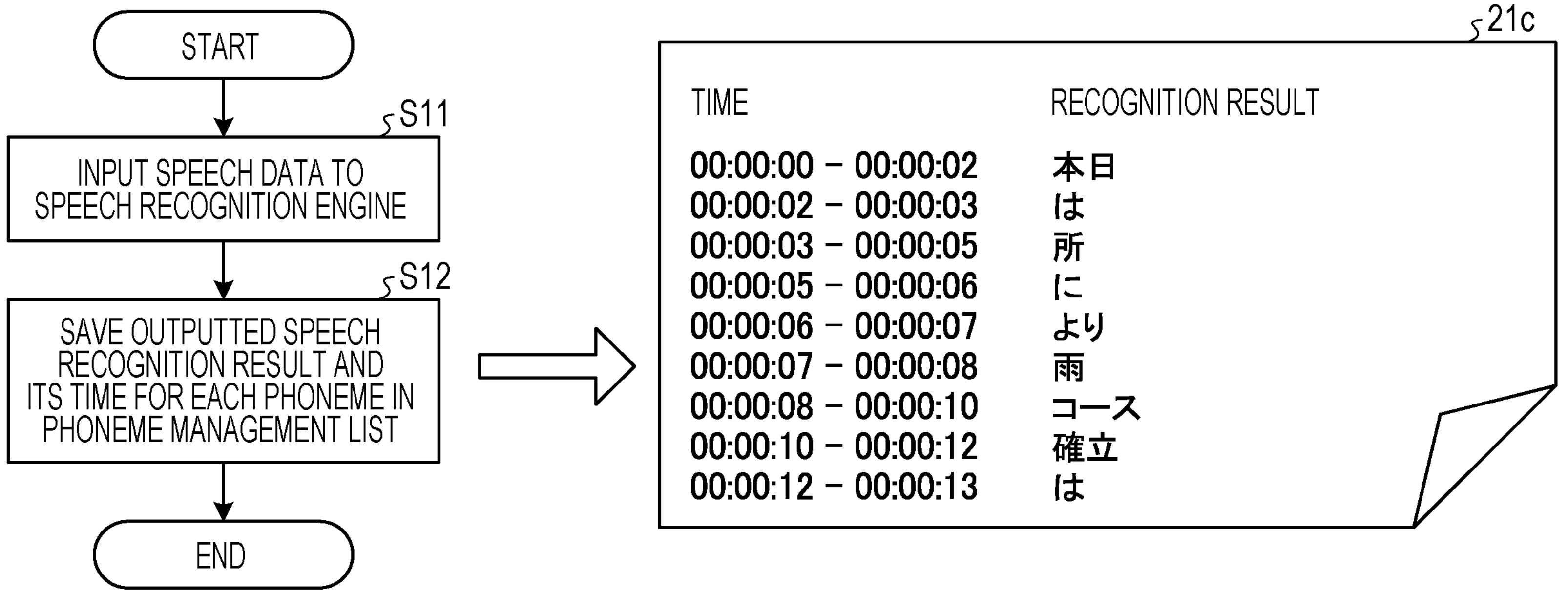
FIG. 4 is a flowchart explaining speech recognition by a speech recognition engine.

FIG. 4 is a flowchart explaining speech recognition by the speech recognition engine 21*b*. As illustrated in FIG. 4, the control unit 21*a* inputs speech data in the speech file 11*a* to the speech recognition engine 21*b* (S11). Next, the control unit 21*a* saves the speech recognition result outputted by the speech recognition engine 21*b* and the time of the recognized speech in the phoneme management table 21*c* for each phoneme (S12).

Referring back to FIG. 2, after S1, the control unit 21*a* adds reliability indicating the accuracy of speech recognition obtained by the speech recognition engine 21*b* to the phoneme management table 21*c* together with the speech recognition result (S2). As illustrated in FIG. 3A, for example, the control unit 21*a* acquires reliability expressed as a percentage, together with the speech recognition result of 「本日は所により雨，コース確立は . . . 」(meaning "Today, we'll have scattered showers. The course establishment is . . . ") and adds the acquired reliability to the phoneme management table 21*c*.

Figure 5A:
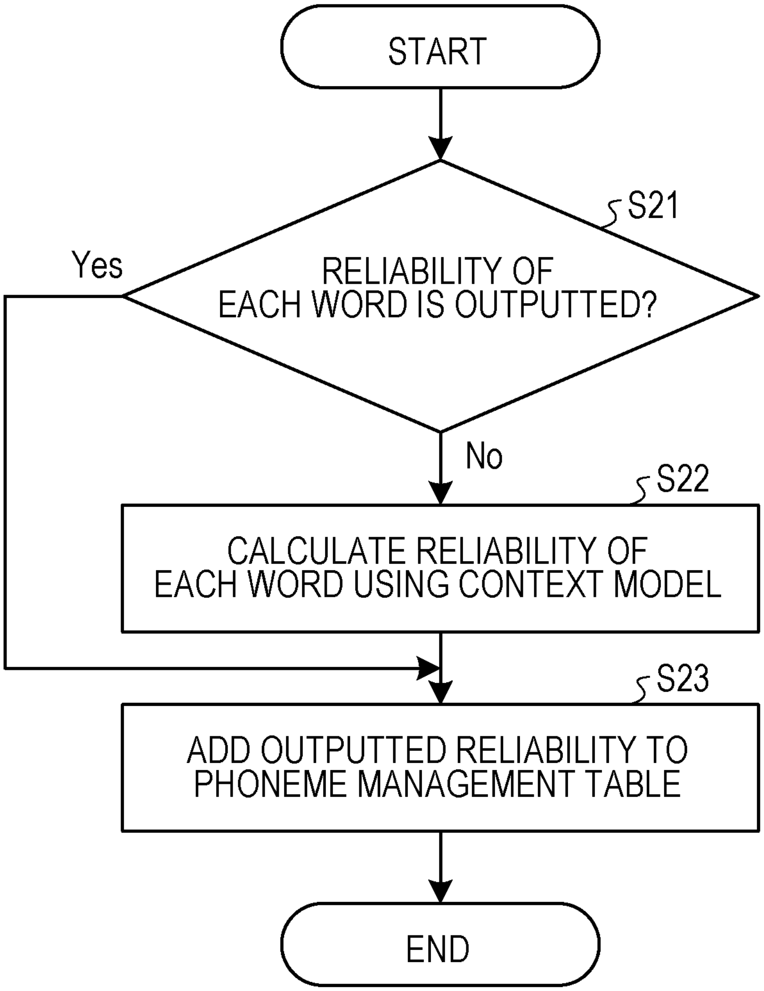
FIG. 5A is a flowchart illustrating an example of reliability addition processing.
Figure 5B:
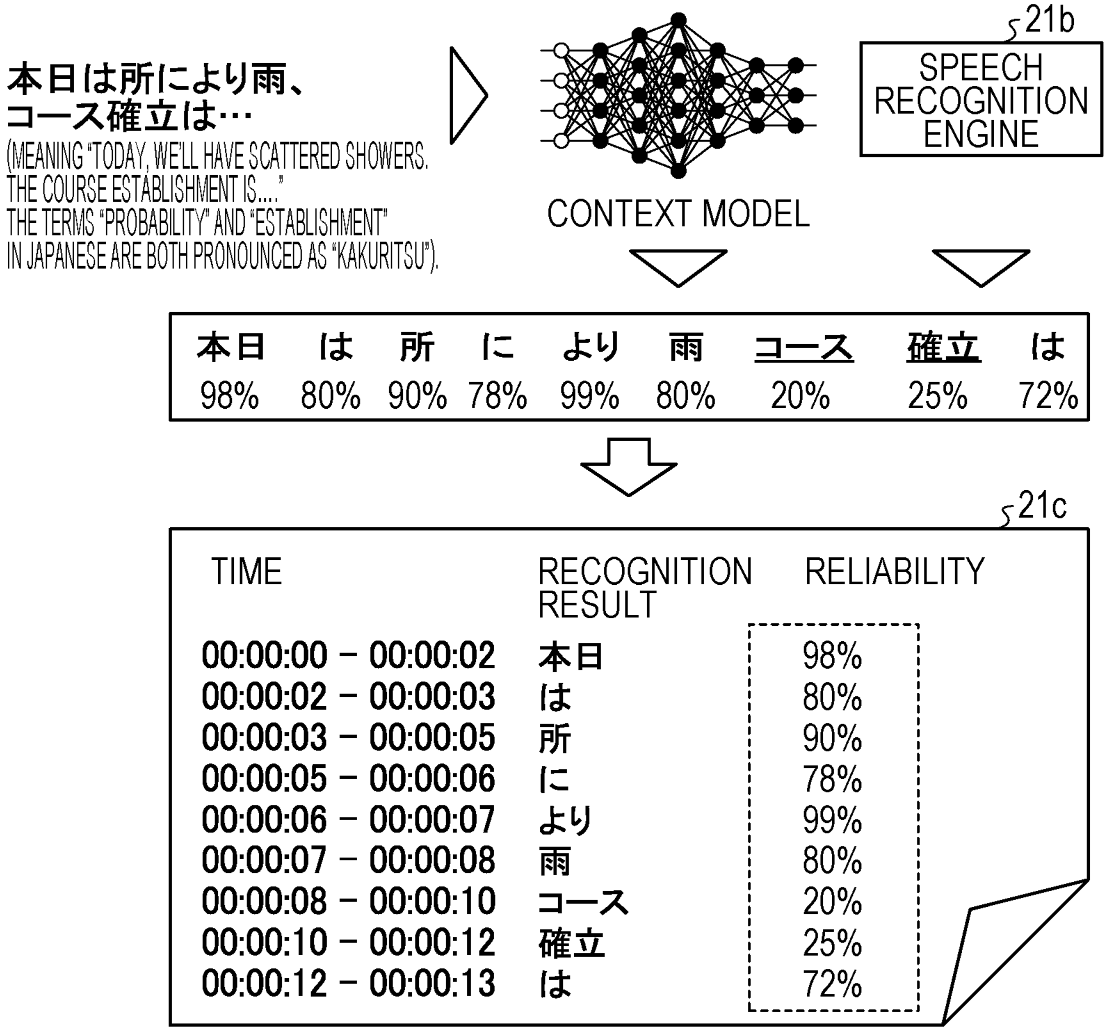
FIG. 5B is an explanatory diagram explaining addition of reliability.

FIG. 5A is a flowchart illustrating an example of reliability addition processing. FIG. 5B is an explanatory diagram explaining addition of reliability.

As illustrated in FIG. 5A, once the reliability addition processing is started, the control unit 21*a* checks whether or not the speech recognition engine 21*b* outputs the reliability of each word subjected to speech recognition (S21). When the speech recognition engine 21*b* outputs the reliability (S21: YES), the control unit 21*a* adds the reliability outputted by the speech recognition engine 21*b* to the phoneme management table 21*c* (S23).

When the speech recognition engine 21*b* does not output the reliability (S21: NO), the control unit 21*a* uses the context model previously learned to output the reliability with the deep learning method to calculate the reliability of each word recognized by the speech recognition engine 21*b* (S22). For example, upon receipt of the recognition result from the speech recognition engine 21*b*, the control unit 21*a* uses the context model learned to output the reliability of the recognition result to calculate the reliability. Next, the control unit 21*a* adds the calculated reliability to the phoneme management table 21*c* (S23).

As illustrated in FIG. 5B, for example, when the speech recognition engine 21*b* outputs the reliability of each word together with the speech recognition result of 「本日は所により雨，コース確立は . . . 」(meaning "Today, we'll have scattered showers. The course establishment is . . . "), the control unit 21*a* adds the reliability outputted together with the recognition result to the phoneme management table 21*c*. When the speech recognition engine 21*b* does not output the reliability, the control unit 21*a* obtains the reliability of each word by inputting the speech recognition result of 「本日は所により雨，コース確立は . . . 」(meaning "Today, we'll have scattered showers. The course establishment is . . . ") to the context model. Then, the control unit 21*a* adds the reliability obtained using the context model to the phoneme management table 21*c*.

Referring back to FIG. 2, after S2, the control unit 21*a* determines the genre of the speech in the speech file 11*a*, based on the phoneme in a high reliability section among the phonemes in the phoneme management table 21*c* (S3). Examples of the speech genre determined by the control unit 21*a* include weather forecast, variety program, documentary, and the like.

For example, the control unit 21*a* determines the genre by inputting data of the phoneme in the high reliability section to the context model previously learned to output the genre with the deep learning method. As illustrated in FIG. 3A, for example, the control unit 21*a* determines the genre 「天気予報」(meaning "weather forecast") by inputting the highly reliable speech recognition result of 「本日は所により雨」(meaning "Today, we'll have scattered showers") to the context model.

Figure 6A:
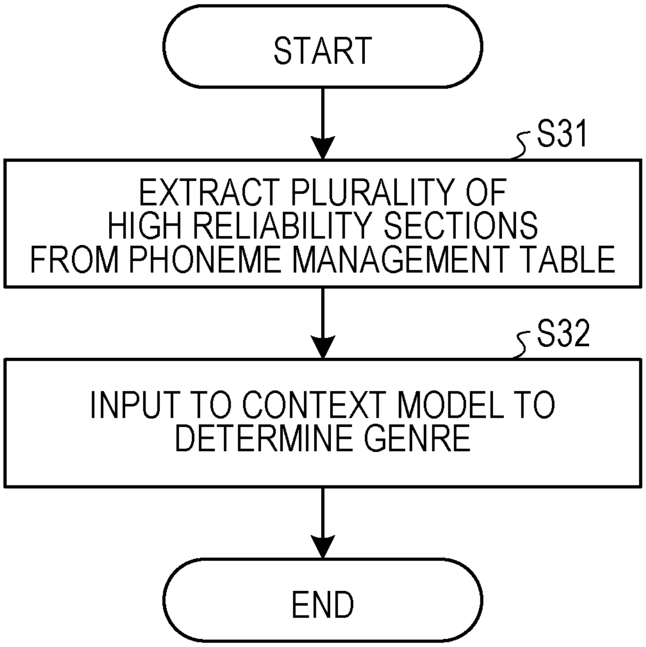
FIG. 6A is a flowchart illustrating an example of genre determination processing.
Figure 6B:
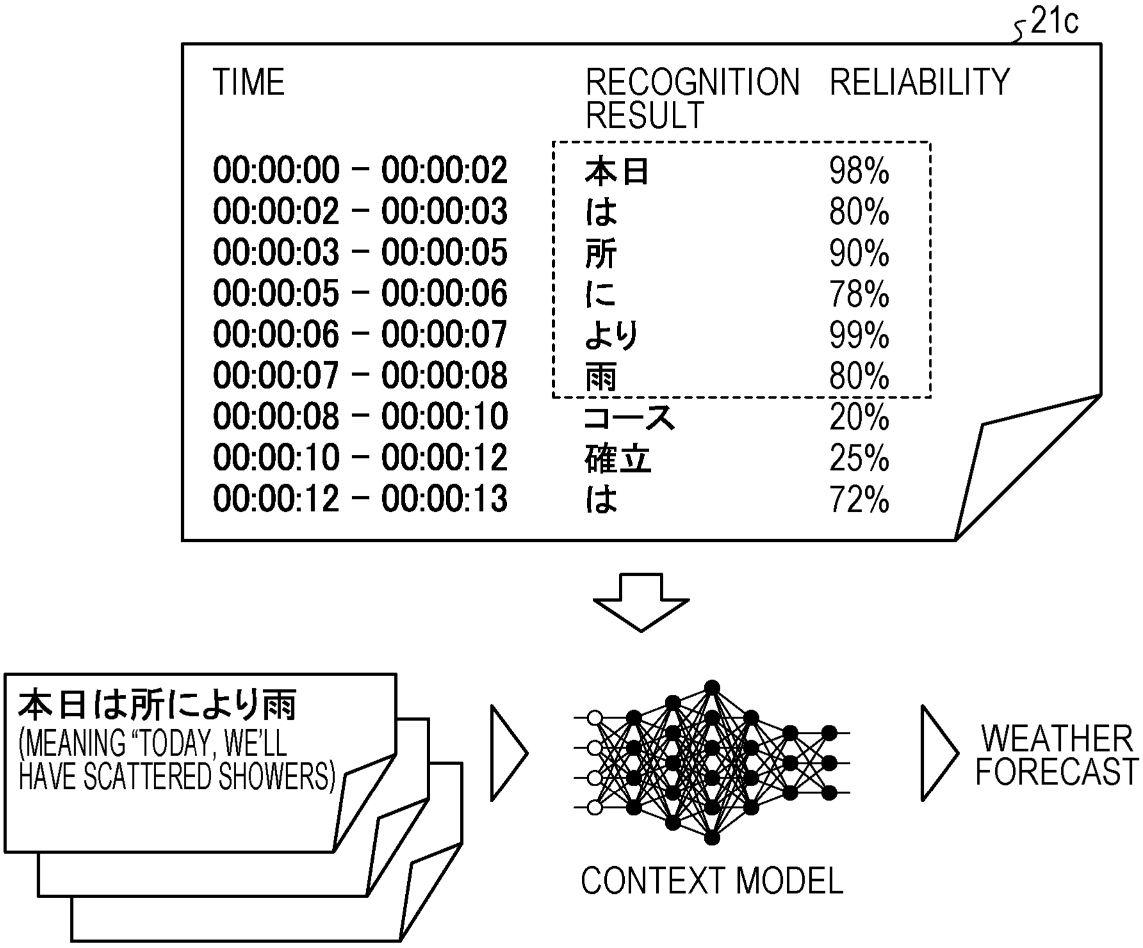
FIG. 6B is an explanatory diagram explaining genre determination.

FIG. 6A is a flowchart illustrating an example of genre determination processing. FIG. 6B is an explanatory diagram explaining genre determination.

As illustrated in FIG. 6A, once the genre determination processing is started, the control unit 21*a* extracts a plurality of high-reliability sections, based on the reliability for each phoneme, from the phoneme management table 21*c* (S31). As illustrated in FIG. 6B, for example, the control unit 21*a* extracts sections having reliability of a predetermined value (for example, 60%) or more.

Next, the control unit 21*a* determines the genre by inputting the phonemes in the extracted sections to the learned context model (S32). As illustrated in FIG. 6B, for example, the control unit 21*a* determines the genre 「天気予報」(meaning "weather forecast") by inputting the phonemes in the highly reliable section of 「本日は所により雨」(meaning "Today, we'll have scattered showers") to the context model.

Referring back to FIG. 2, after S3, the control unit 21*a* generates section speech data by cutting out speech data corresponding to phonemes in a low-reliability section among the phonemes in the phoneme management table 21*c* (S4). As illustrated in FIG. 3A, for example, the control unit 21*a* cuts out speech data for a low-reliability section of 「コース確立」(meaning "The course establishment").

Figure 7A:
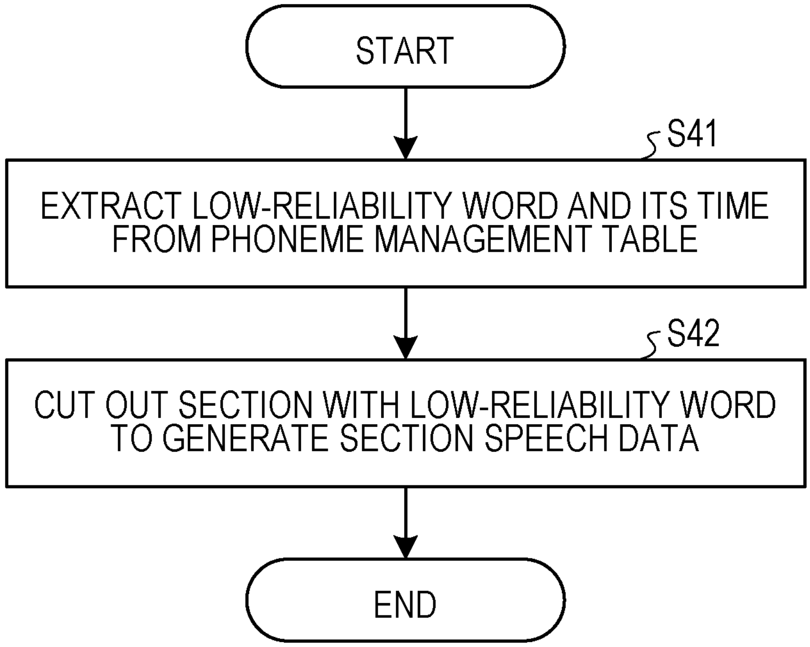
FIG. 7A is a flowchart illustrating an example of section speech data generation processing.
Figure 7B:
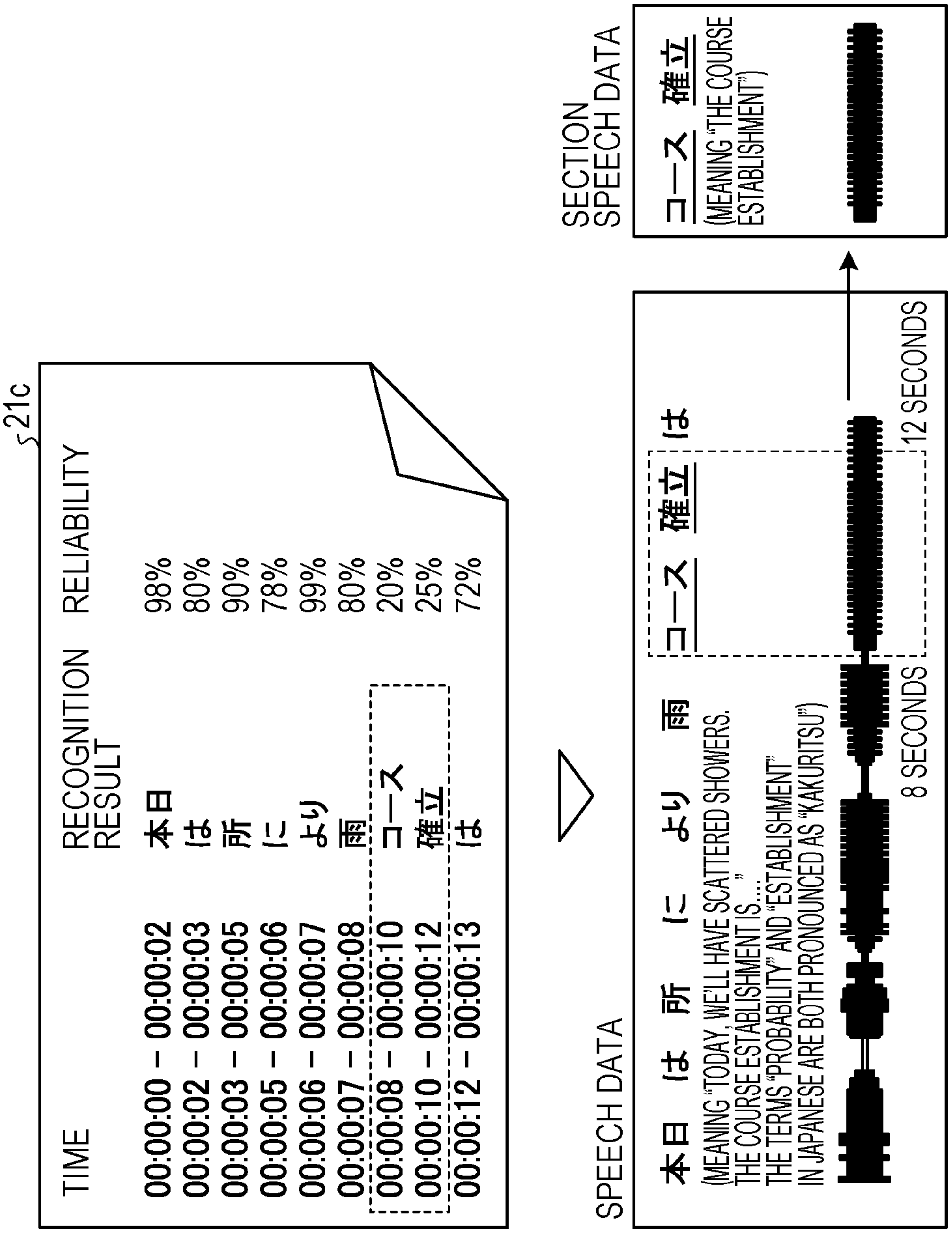
FIG. 7B is an explanatory diagram explaining section speech data generation.

FIG. 7A is a flowchart illustrating an example of section speech data generation processing. FIG. 7B is an explanatory diagram explaining section speech data generation.

As illustrated in FIG. 7A, once the section speech data generation processing is started, the control unit 21*a* extracts a low-reliability word and time, based on the reliability for each phoneme, from the phoneme management table 21*c* (S41). As illustrated in FIG. 7B, for example, the control unit 21*a* extracts a section having reliability of a predetermined value (for example, 60%) or less from the phoneme management table 21*c*.

Next, the control unit 21*a* generates section speech data by cutting a section having the low-reliability word out of the speech data in the speech file 11*a*, based on the time extracted in S41 (S42). As illustrated in FIG. 7B, for example, the control unit 21*a* generates section speech data corresponding to the low-reliability section of 「コース確立」 (meaning "The course establishment").

Referring back to FIG. 2, after S4, the control unit 21*a* uses the section speech data to perform a plurality of speech recognition processes different from each other for re-recognition, and enters the recognition results in the replacement candidate list 21*e* (S5).

As illustrated in FIG. 3A for example, as for the section of 「コース確立」 (meaning "The course establishment"), the control unit 21*a* obtains a recognition result of 「国立」 (meaning "national", pronounced as "kokuritsu" in Japanese) through re-recognition using an SE filter and the speech recognition engine 21*b*. The control unit 21*a* also obtains a recognition result of 「降水確率」 (meaning "precipitation probability") through re-recognition using a BGM filter and the speech recognition engine 21*b*. The control unit 21*a* also obtains a recognition result of 「香水確立」 (meaning "perfume establishment". The term "perfume" in Japanese is also pronounced as "kousui") through re-recognition using another speech recognition engine. The control unit 21*a* also obtains a recognition result of 「越す確率」 (meaning "excessing probability"). The term "excessing" in Japanese is pronounced as "kosu") through similar sound search using a corpus or the like to search for a word with the same or similar sound. Then, the control unit 21*a* enters the recognition results of 「国立」 (meaning "national", 「降水確率」 (meaning "precipitation probability"), 「香水確立」 (meaning "perfume establishment"), 「越す確率」 (meaning "excessing probability" and the like in the replacement candidate list 21*e*.

Figure 8:
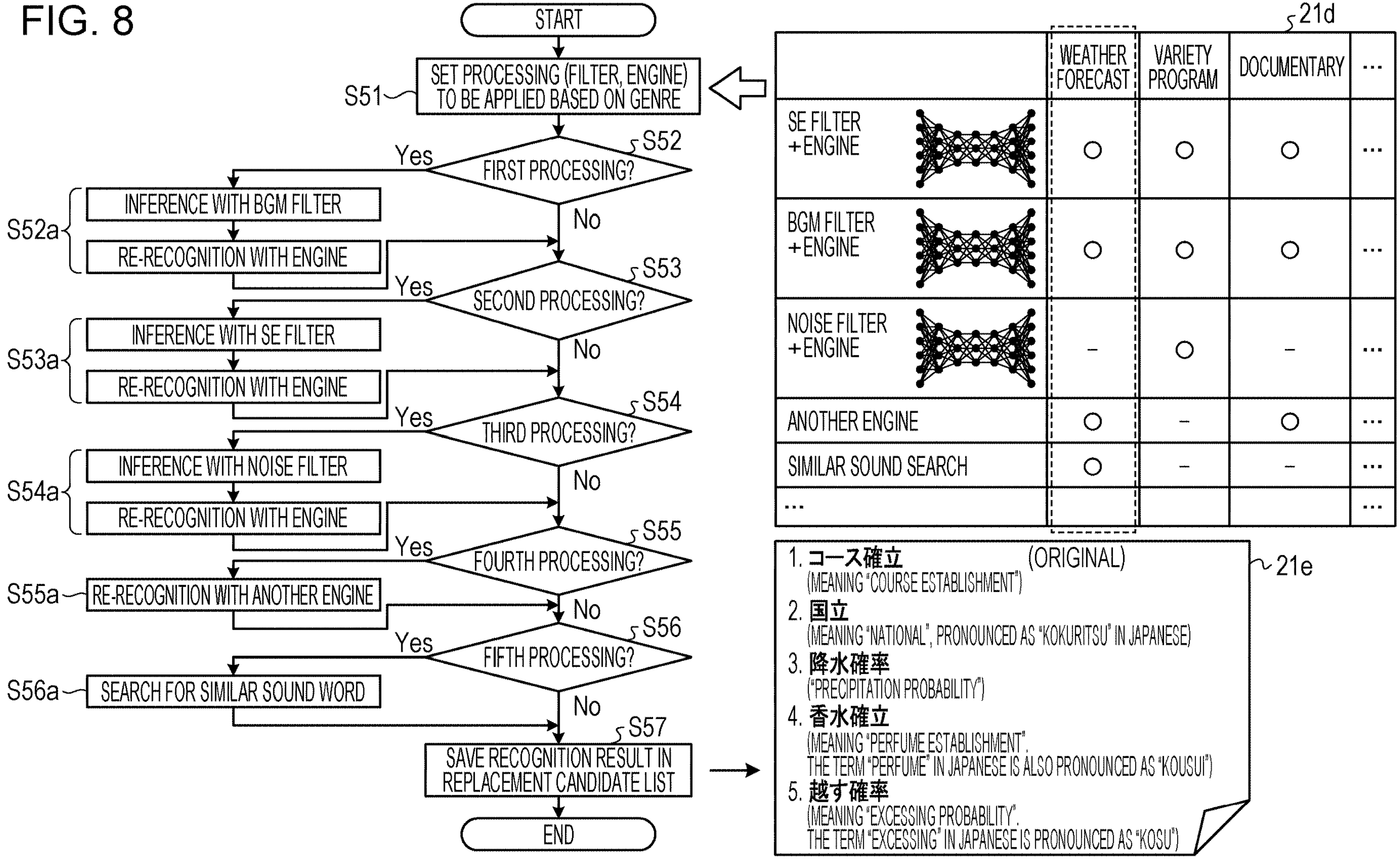
FIG. 8 is a flowchart illustrating an example of re-recognition processing.

FIG. 8 is a flowchart illustrating an example of re-recognition processing. As illustrated in FIG. 8, once the re-recognition processing is started, the control unit 21*a* sets processing (filter and engine) to be applied, based on the genre determined in S3, by referring to the genre-specific replacement candidate generation method table 21*d* (S51).

When the determined genre is "weather forecast", for example, the control unit 21*a* sets, by referring to the genre-specific replacement candidate generation method table 21*d*, the SE filter+speech recognition engine 21*b*, the BGM filter+speech recognition engine 21*b*, another engine, and similar sound search as the processing to be applied.

Next, the control unit 21*a* determines, based on the settings in S51, which one of the plurality of speech recognition processes (first to fifth processes in the example illustrated in FIG. 8) is to be applied (S52, S53, S54, S55, S56). Then, the control unit 21*a* performs the process (S52*a*, S53*a*, S54*a*, S55*a*, S56*a*) determined to be applied (S52, S53, S54, S55, S56: YES).

For example, when the first process is applied using the BGM filter+speech recognition engine 21*b* (S52: YES), the control unit 21*a* sets parameters of the BGM filter by referring to the filter information 31*b* and performs inference using the BGM filter. Then, the control unit 21*a* uses the speech recognition engine 21*b* to re-recognize the speech data after the filter application (S52*a*).

When the second process is applied using the SE filter+speech recognition engine 21*b* (S53: YES), the control unit 21*a* sets parameters of the SE filter by referring to the filter information 31*b* and performs inference using the SE filter. Then, the control unit 21*a* uses the speech recognition engine 21*b* to re-recognize the speech data after the filter application (S53*a*).

When the third process is applied using a noise filter+speech recognition engine 21*b* (S54: YES), the control unit 21*a* sets parameters of the noise filter by referring to the filter information 31*b* and performs inference using the noise filter. Then, the control unit 21*a* uses the speech recognition engine 21*b* to re-recognize the speech data after the filter application (S54*a*).

When the fourth process is applied using another engine (S55: YES), the control unit 21*a* performs speech recognition using another engine (S55*a*).

When the fifth process is applied using similar sound search (S56: YES), the control unit 21*a* uses a corpus or the like to search for a similar sound word (S56*a*).

Thereafter, the control unit 21*a* saves the recognition results from the plurality of speech recognition processes different from each other in the replacement candidate list 21*e* (S57), and then terminates the processing.

Referring back to FIG. 2, after S5, the control unit 21*a* generates the text candidate list 32*a* by embedding the word entered by the control unit 21*a* into an original text indicated by the phoneme management table 21*c* (S6).

Figure 9:
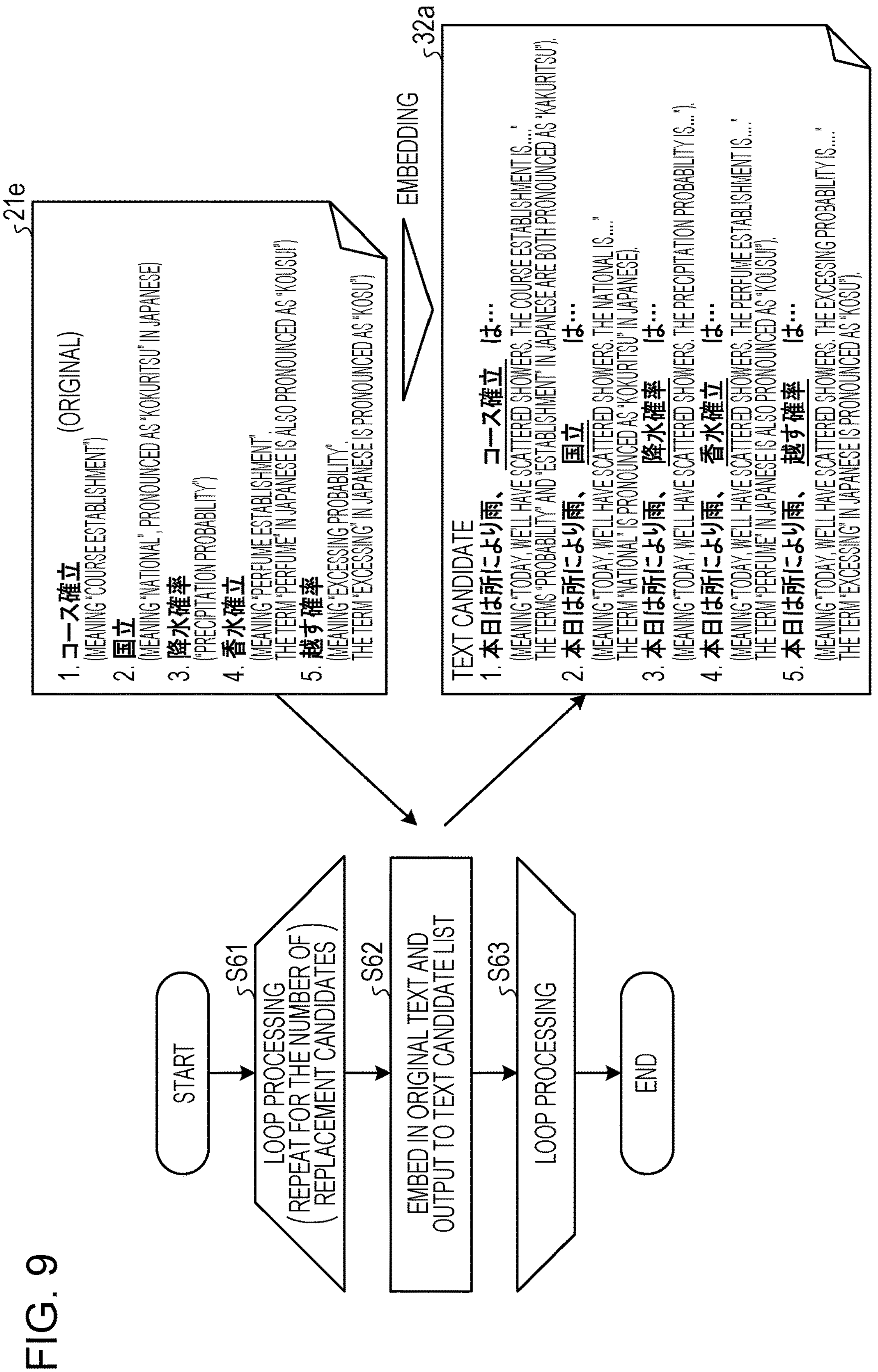
FIG. 9 is a flowchart illustrating an example of text candidate list generation processing.

FIG. 9 is a flowchart illustrating an example of processing of generating the text candidate list 32*a*. As illustrated in FIG. 9, once the generation processing is started, the control unit 21*a* performs loop processing (S61 to S63) repeated for the number of the replacement candidates (plurality of recognition results) listed in the replacement candidate list 21*e*, and then terminates the processing. For example, the control unit 21*a* generates the text candidate list 32*a* by embedding the respective recognition results in the replacement candidate list 21*e* into the original text indicated by the phoneme management table 21*c*, and outputs the generated text candidate list 32*a* (S62).

Referring back to FIG. 2, after S6, the context verification unit 22 checks consistency of the text listed in the text candidate list 32*a* and adds the check result in the text candidate list 32*a* (S7). As illustrated in FIG. 3B, for example, in S7, a text listed for each recognition result in the text candidate list 32*a* is inputted to the context model to obtain the context consistency of the text.

Figure 10A:
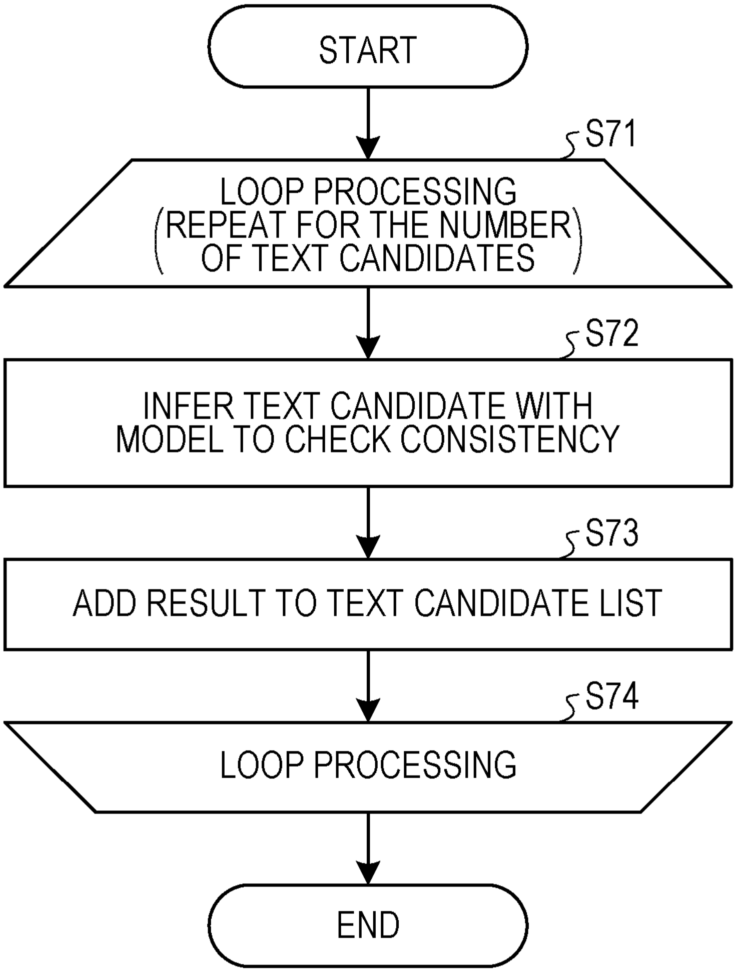
FIG. 10A is a flowchart illustrating an example of consistency check processing.

FIG. 10A is a flowchart illustrating an example of consistency check processing. FIG. 10B is an explanatory diagram explaining consistency check.

As illustrated in FIG. 10A, once the consistency check processing is started, the context verification unit 22 performs loop processing (S71 to S74) repeated for the number of text candidates (number of recognition results), and then terminates the processing.

For example, the context verification unit 22 checks the consistency by acquiring a value indicating consistency through inference (inference phase) for inputting the text candidate in the text candidate list 32*a* to the context model (S72). Next, the context verification unit 22 adds the consistency check result (obtained value) to the text candidate list 32*a* (S73).

As illustrated in FIG. 10B, for example, the context verification unit 22 adds the value indicating consistency obtained by inputting the text candidates 1 to 5 in the text candidate list 32*a* to the context model. For example, the context verification unit 22 inputs the fifth text 「本日は所により雨，越す確率は . . . 」 (meaning "Today, we'll have scattered showers. The excessing probability is . . . ". The term "excessing" in Japanese is pronounced as "kosu") listed in the text candidate list 32*a* to the context model to obtain consistency (50%) for the context of the text. Then, the context verification unit 22 adds the obtained value (50%) to the text candidate list 32*a*.

Referring back to FIG. 2, the context verification unit 22 vectorizes the caption 32*b* and the text in the text candidate list 32*a* to obtain a context vector. Next, the context verification unit 22 compares the similarity between the context vectors and adds the comparison result to the text candidate list 32*a* (S8).

As illustrated in FIG. 3C, for example, the context verification unit 22 obtains similarities between the context vectors (V1 to V5) obtained from the texts 1 to 5 in the text candidate list 32*a* and the context vector (V0) of the caption 32*b*. Then, the context verification unit 22 adds the obtained similarities to the texts 1 to 5 in the text candidate list 32*a*.

Figure 11A:
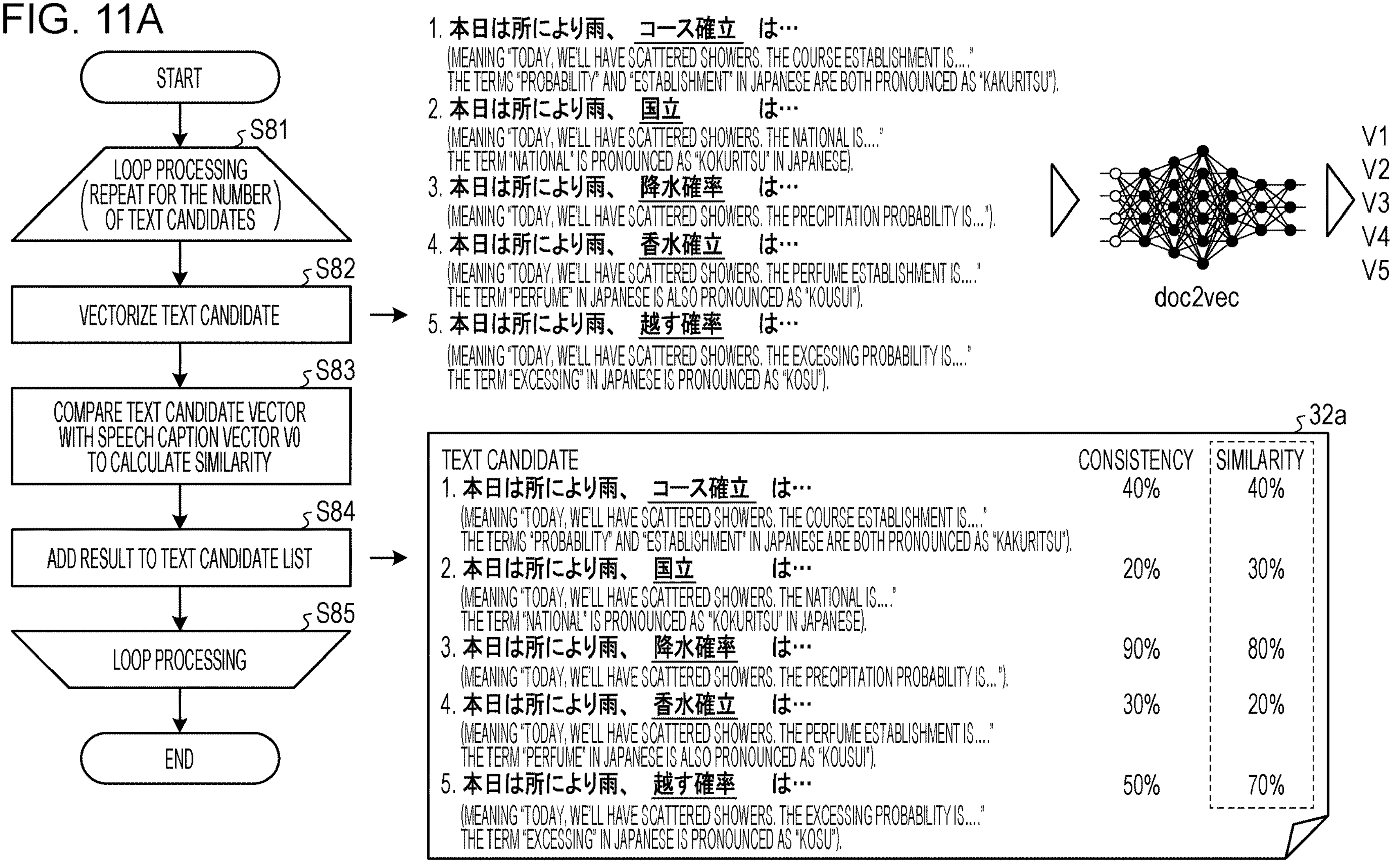
FIG. 11A is a flowchart illustrating an example of similarity verification processing.

FIG. 11A is a flowchart illustrating an example of similarity verification processing. As illustrated in FIG. 11A, once the similarity verification processing is started, the context verification unit 22 performs loop processing (S81 to S85) repeated for the number of text candidates (number of recognition results), and then terminates the processing.

For example, the context verification unit 22 uses a technology such as doc2vec to vectorize the caption 32*b* and the text candidates in the text candidate list 32*a* (S82).

Figure 11B:
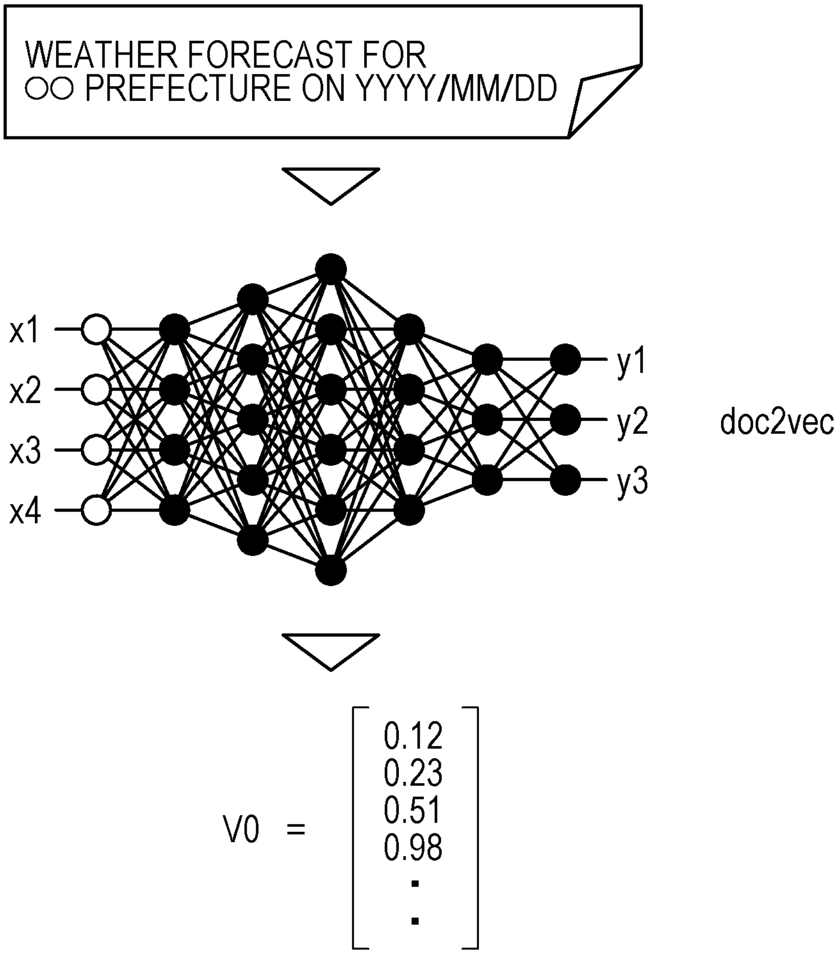
FIG. 11B is an explanatory diagram explaining caption vectorization.

FIG. 11B is an explanatory diagram explaining vectorization of the caption 32*b*. As illustrated in FIG. 11B, the context verification unit 22 inputs the text of the caption 32*b*, for example, to a neural network, to which doc2vec is applied, to vectorize the context of the caption 32*b*, thereby obtaining the context vector (V0).

Next, the context verification unit 22 calculates similarities by comparing the vectors (V1 to V5) of the text candidates (1 to 5 in the example illustrated in FIG. 11A) with the vector (V0) of the caption 32*b* of the speech (S83). Then, the context verification unit 22 adds the obtained similarities to the text candidates in the text candidate list 32*a*, respectively (S84).

Referring back to FIG. 2, after S8, the evaluation unit 23 determines the most appropriate correction (text candidate) from among the values of the similarity and consistency for the text candidates in the text candidate list 32*a*. Next, the evaluation unit 23 applies the determined content as the speech recognition result (S9) and outputs the text data 12 indicating the speech recognition result through the input-output unit 10 (S10).

As illustrated in FIG. 3B, for example, the evaluation unit 23 obtains a text candidate ranking in the order of 3, 5, and 1 from the similarity and consistency values of the text candidates 1 to 5 in the text candidate list 32*a*. Then, the evaluation unit 23 outputs the third text candidate 「本日は所により雨，降水確率は . . . 」 (meaning "Today, we'll have scattered showers. The precipitation probability is . . . ".) ranked at the top as the text data 12.

Figure 12:
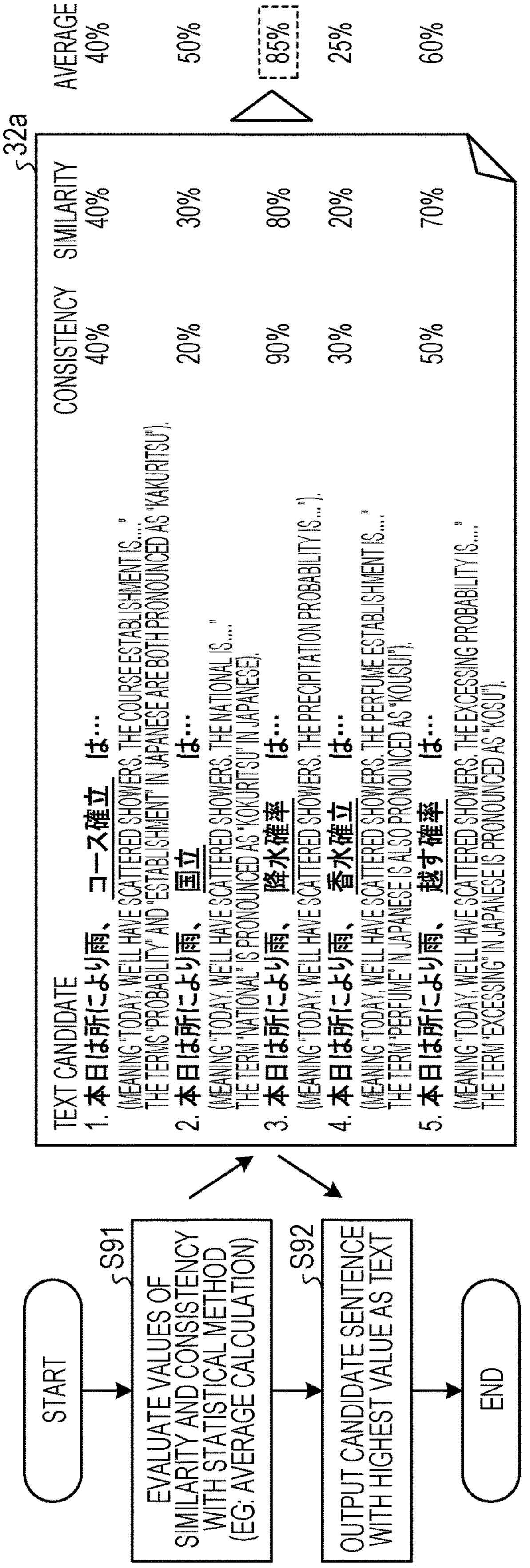
FIG. 12 is a flowchart illustrating an example of evaluation processing.

FIG. 12 is a flowchart illustrating an example of evaluation processing. As illustrated in FIG. 12, once the evaluation processing is started, the evaluation unit 23 uses a statistical method to evaluate the similarity and consistency values of the text candidates in the text candidate list 32*a* (S91). For example, as an example of the evaluation using the statistical method, the evaluation unit 23 calculates an average of the similarity and consistency values.

Next, the evaluation unit 23 outputs a candidate sentence having the highest value evaluated with the statistical method, among the text candidates in the text candidate list 32*a*, as the text data 12 (S92).

The context model for performing the reliability calculation, genre determination, context consistency evaluation, similarity measurement using doc2vec, and the like, the speech filter for speech recognition, and the like are realized using a learning model learned by machine learning such as deep learning.

Figure 13:
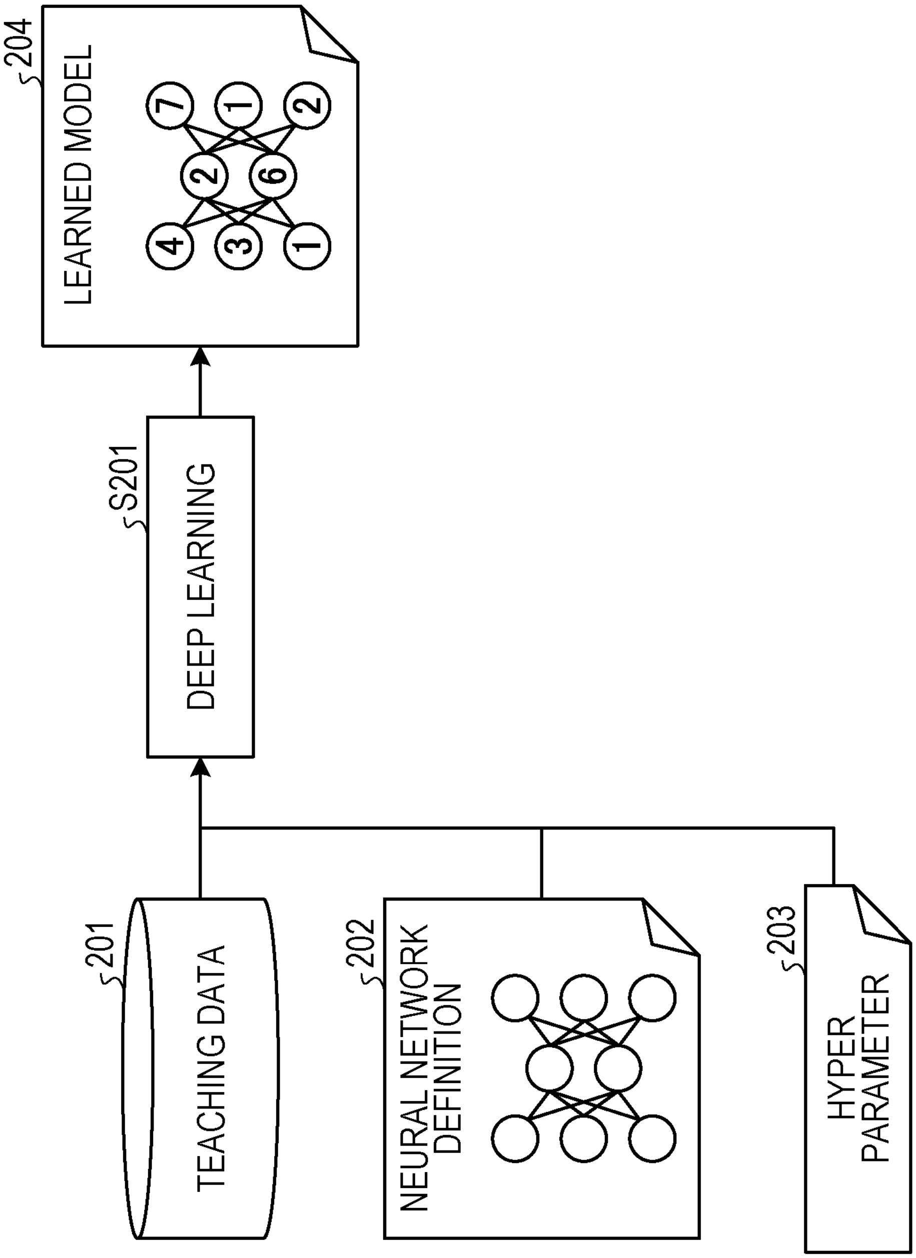
FIG. 13 is an explanatory diagram explaining an example of a learning phase.

FIG. 13 is an explanatory diagram explaining an example of a learning phase. As illustrated in FIG. 13, in deep learning (S201), a neural network definition 202 and a hyper parameter 203 are used to build an initial neural network. Next, in the deep learning, teaching data 201 is applied to the built neural network to perform learning of the neural network so as to execute the reliability calculation, genre determination, context consistency evaluation, similarity measurement using doc2vec, speech filter, and the like. The teaching data 201 is sample data to be a teacher for learning of the neural network such as reliability calculation, genre determination, context consistency evaluation, similarity measurement using doc2vec, and speech filter.

For example, in the deep learning (S201), a difference (loss) between an inference result obtained by forward propagating the teaching data 201 to the neural network and correct answer data included in the teaching data 201 is obtained. Next, the obtained difference is back-propagated to the neural network to change parameters of each node in the neural network, thus approximating an optimum solution. With such deep learning (S201), the parameters of each node in the neural network are obtained as a learned model 204.

Figure 14:
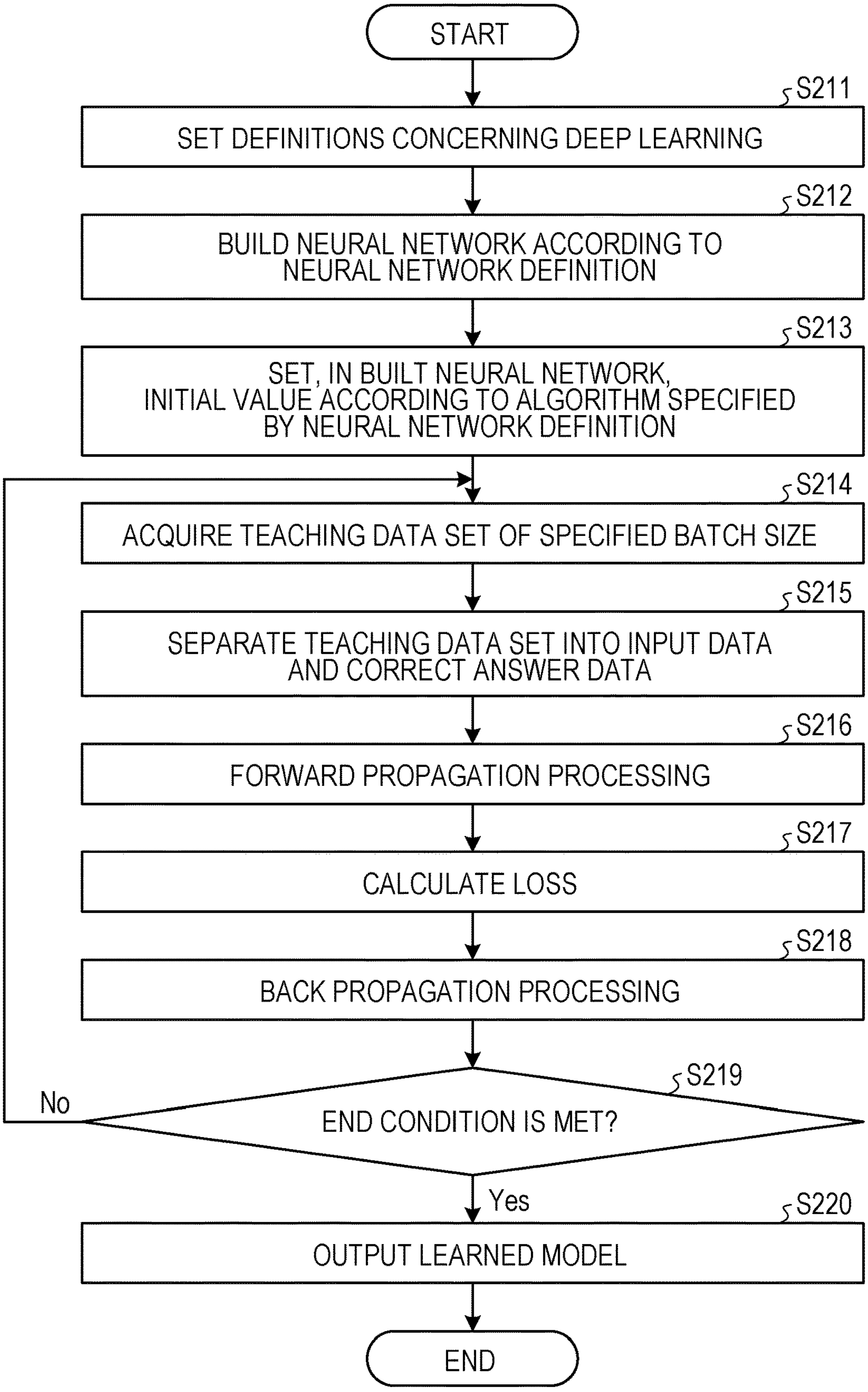
FIG. 14 is a flowchart illustrating an operation example of the learning phase.

FIG. 14 is a flowchart illustrating an operation example of the learning phase. As illustrated in FIG. 14, once processing is started, the speech recognition processor 20 sets definitions concerning the deep learning based on the hyper parameter 203 (S211). Next, the speech recognition processor 20 builds a neural network according to the neural network definition 202 (S212).

Then, the speech recognition processor 20 sets an initial value in the built neural network according to an algorithm specified in the neural network definition 202 (S213). Thereafter, the speech recognition processor 20 acquires a teaching data set of a predetermined batch size from the teaching data 201 (S214).

Next, the speech recognition processor 20 separates the acquired teaching data set into input data and correct answer data (S215) and performs forward propagation processing for inputting and forward propagating the input data to the built neural network (S216).

Then, the speech recognition processor 20 calculates a loss (difference) by comparing the output value obtained by the forward propagation in the neural network with the correct answer data (S217). Thereafter, the speech recognition processor 20 performs back propagation processing for approximating the parameters of each node in the neural network to the optimum solution by back-propagating the obtained loss to the neural network (S218).

Subsequently, the speech recognition processor 20 determines whether or not a preset termination condition is met (S219). When the condition is not met (S219: NO), the processing returns to S214. When the condition is met (S219: YES), the speech recognition processor 20 outputs the parameters of each node in the neural network, that is, the learned model 204 obtained by repeating S214 to S219 (S220).

Figure 15:
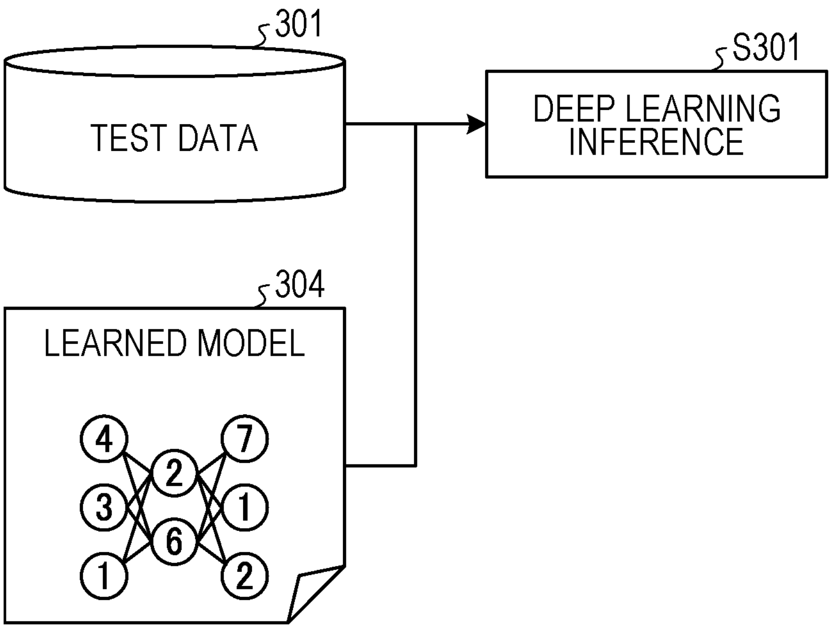
FIG. 15 is an explanatory diagram explaining an example of an inference phase.

FIG. 15 is an explanatory diagram explaining an example of an inference phase. As illustrated in FIG. 15, in the inference phase (S301), a neural network is built based on the learned model 204 obtained in the learning phase. Next, in the inference phase (S301), test data 301 to be subjected to reliability calculation, genre determination, context consistency evaluation, similarity measurement using doc2vec, speech filter, and the like is applied to the neural network. Thus, processing results (inference results) of the reliability calculation, genre determination, context consistency evaluation, similarity measurement using doc2vec, speech filter, and the like may be obtained.

Figure 16:
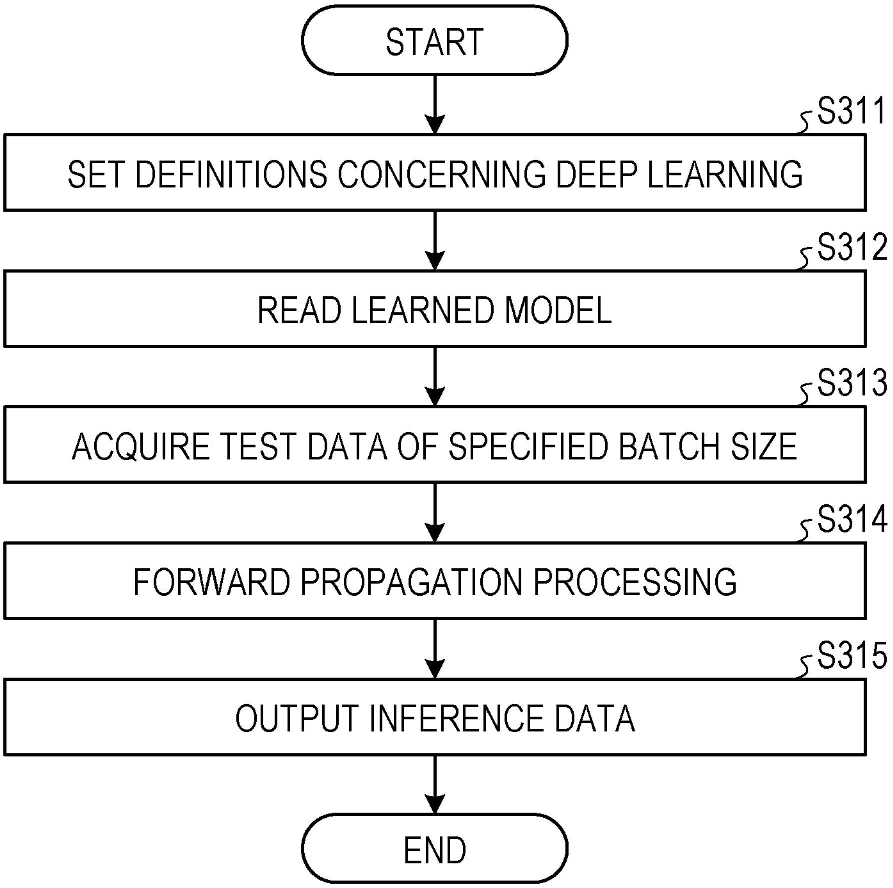
FIG. 16 is a flowchart illustrating an operation example of the inference phase.

FIG. 16 is a flowchart illustrating an operation example of the inference phase. As illustrated in FIG. 16, once the processing is started, the speech recognition processor 20 sets definitions concerning the deep learning based on the hyper parameter 203 as in the case of the learning (S311).

Next, the speech recognition processor 20 reads the learned model 204 to build a neural network corresponding to the learned model 204 (S312). Then, the speech recognition processor 20 acquires test data 301 of a predetermined batch size (S313) and performs forward propagation processing for inputting and forward propagating the test data to the built neural network (S314).

Thereafter, the speech recognition processor 20 outputs an output value from the neural network by the forward propagation processing, that is, inference data as the processing result (S315).

As described above, the speech recognition apparatus 1 includes the speech processor 21, the context verification unit 22, and the evaluation unit 23. The speech processor 21 performs speech recognition of an input speech in a speech file 11*a*, and acquires a plurality of recognition candidates through a plurality of speech recognition processes different from each other for a section having a reliability lower than a predetermined value in the recognition result. The context verification unit 22 verifies similarities between the acquired plurality of recognition candidates and meta-information (caption 11*b*) corresponding to the input speech. Based on the verified similarities, the evaluation unit 23 determines the recognition result of the low-reliability section from among the acquired plurality of recognition candidates.

Thus, as for the section having low reliability of speech recognition, the speech recognition apparatus 1 determines one similar to the caption 11*b*, for example, based on the similarity to the meta-information corresponding to the input speech from among the plurality of recognition candidates. Therefore, the speech recognition apparatus 1 may obtain an appropriate recognition result conforming to the content of the input speech, and thus may improve the speech recognition accuracy.

The speech processor 21 also acquires a plurality of recognition candidates for the low-reliability section through the plurality of speech recognition processes in the genre-specific replacement candidate generation method table 21*d*, corresponding to the genre determined based on the section having reliability higher than a predetermined value in the recognition result. Thus, the speech recognition apparatus 1 uses the genre determined based on the section having high reliability of speech recognition to perform the speech recognition process for the low-reliability section. Thus, the speech recognition apparatus 1 may accurately re-recognize the low-reliability section.

The context verification unit 22 verifies context consistency when the recognition candidate is embedded in the section having low reliability of speech recognition, for the plurality of recognition candidates. Based on the similarity and consistency, the evaluation unit 23 determines a recognition result for the section having low reliability of speech recognition. Accordingly, the speech recognition apparatus 1 determines the recognition result for the section having low reliability of speech recognition based on the context consistency, and thus may obtain a more accurate recognition result.

All of or some of the various processing functions executed by the speech recognition apparatus 1 may be executed on a central processing unit (CPU) (or a microcomputer such as a micro processing unit (MPU) or a micro controller unit (MCU)). Needless to say, all of or some of the various processing functions may be executed on a program analyzed and executed by the CPU (or a microcomputer such as MPU or MCU) or on hardware using wired logic. Such various processing functions executed by the speech recognition apparatus 1 may also be executed by a plurality of computers in cooperation through cloud computing.

Figure 17:
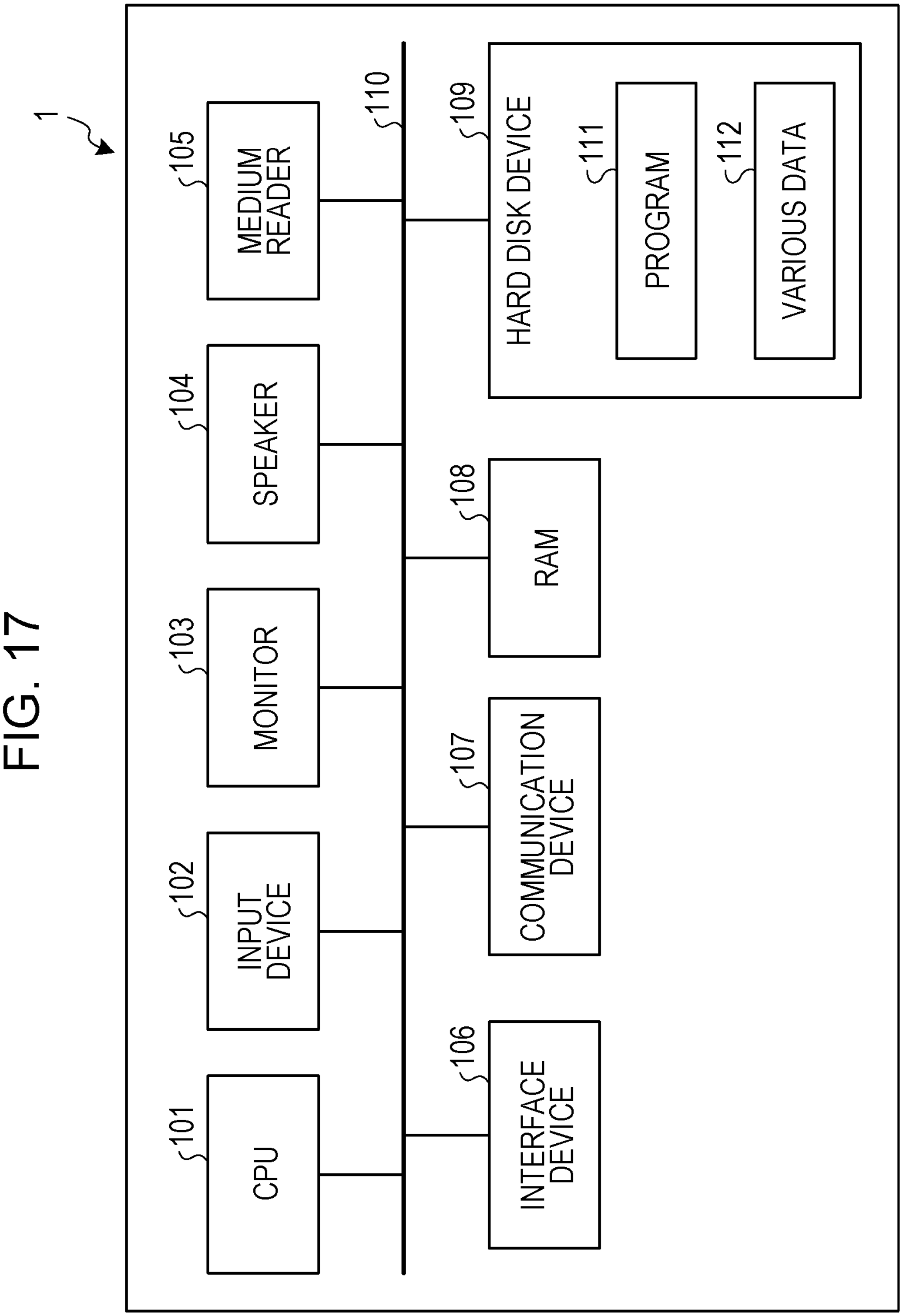
FIG. 17 is a block diagram illustrating an example of a hardware configuration of the speech recognition apparatus according to the embodiment.

The various kinds of processing described in the above embodiment may be realized by a computer executing a prepared program. Hereinafter, description is given of an example of a computer (hardware) that executes a program with the same functions as those of the above embodiment. FIG. 17 is a block diagram illustrating an example of a hardware configuration of the speech recognition apparatus 1 according to the embodiment.

As illustrated in FIG. 17, the speech recognition apparatus 1 includes a CPU 101 that executes various kinds of arithmetic processing, an input device 102 that receives data input, a monitor 103, and a speaker 104. The speech recognition apparatus 1 also includes a medium reader 105 that reads programs and the like from a storage medium, an interface device 106 for connecting to various devices, and a communication device 107 for wired or wireless connection with an external device for communication. The speech recognition apparatus 1 further includes a RAM 108 that temporarily stores various information and a hard disk device 109 that provides functions as the storage unit 30. The respective units (101 to 109) in the speech recognition apparatus 1 are connected to a bus 110.

The hard disk device 109 stores a program 111 for executing various kinds of processing associated with the input-output unit 10 and the speech recognition processor 20 described in the above embodiment. The hard disk device 109 also stores various data 112 to be referred to by the program 111. The input device 102 receives input of operation information from an operator of the speech recognition apparatus 1, for example. The monitor 103 displays various screens operated by the operator, for example. The interface device 106 has a printer and the like, for example, connected thereto. The communication device 107 is connected to a communication network such as a local area network (LAN) to exchange various information with the external device through the communication network.

The CPU 101 performs the various kinds of processing associated with the input-output unit 10 and the speech recognition processor 20 by reading the program 111 stored in the hard disk device 109 and developing and executing the program 111 in the RAM 108. The program 111 does not have to be stored in the hard disk device 109. For example, the program 111 stored in a storage medium readable by the speech recognition apparatus 1 may be read and executed by the speech recognition apparatus 1. Examples of the storage medium readable by the speech recognition apparatus 1 include a portable recording medium such as a CD-ROM, a DVD disk, and a Universal Serial Bus (USB) memory, a semiconductor memory such as a flash memory, a hard disk drive, and the like. Alternatively, the program 111 may be stored in a device connected to a public line, the Internet, a LAN, or the like, and may be read the program 111 from the device and executed by the speech recognition apparatus 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A speech recognition apparatus comprising:

a memory, and a processor coupled to the memory and configured to execute a process including:

performing speech recognition of an input speech to acquire a plurality of recognition candidates through a plurality of speech recognition processes different from each other for a low-reliability section having a reliability lower than a predetermined value;

verifying similarities between each of the acquired plurality of recognition candidates and meta-information corresponding to the input speech; and determining, based on the verified similarities, a recognition result of the low-reliability section from among the acquired plurality of recognition candidates, wherein the performing the speech recognition includes acquiring a plurality of recognition candidates for the low-reliability section through a plurality of speech recognition processes corresponding to a genre determined based on a section having a reliability higher than a predetermined value in the recognition result.

2. The speech recognition apparatus according to claim 1, wherein the verifying includes verifying context consistency, for each of the plurality of recognition candidates, when the recognition candidate is embedded in the low-reliability section, and the determining includes determining a recognition result for the low-reliability section based on the verified similarity and consistency.

3. The speech recognition apparatus according to claim 1, wherein the meta-information is caption information.

4. A non-transitory computer-readable storage medium having stored therein a speech recognition program for causing a computer to execute a process comprising:

performing speech recognition of an input speech to acquire a plurality of recognition candidates through a plurality of speech recognition processes different from each other for a section having a reliability lower than a predetermined value;

verifying similarities between each of the acquired plurality of recognition candidates and meta-information corresponding to the input speech; and determining, based on the verified similarities, a recognition result of the low-reliability section from among the acquired plurality of recognition candidates, wherein the performing the speech recognition includes acquiring a plurality of recognition candidates for the low-reliability section through a plurality of speech recognition processes corresponding to a genre determined based on a section having a reliability higher than a predetermined value in the recognition result.

5. The storage medium according to claim 4, wherein the verifying includes verifying context consistency, for each of the plurality of recognition candidates, when the recognition candidate is embedded in the low-reliability section, and the determining includes determining a recognition result for the low-reliability section based on the verified similarity and consistency.

6. The non-transitory computer-readable storage medium according to claim 4, wherein the meta-information is caption information.

7. A speech recognition method for causing a computer to execute a process comprising:

performing speech recognition of an input speech to acquire a plurality of recognition candidates through a plurality of speech recognition processes different from each other for a section having a reliability lower than a predetermined value;

verifying similarities between each of the acquired plurality of recognition candidates and meta-information corresponding to the input speech; and determining, based on the verified similarities, a recognition result of the low-reliability section from among the acquired plurality of recognition candidates, wherein the performing the speech recognition includes acquiring a plurality of recognition candidates for the low-reliability section through a plurality of speech recognition processes corresponding to a genre determined based on a section having a reliability higher than a predetermined value in the recognition result.

8. The speech recognition method according to claim 7, wherein the verifying includes verifying context consistency, for each of the plurality of recognition candidates, when the recognition candidate is embedded in the low-reliability section, and the determining includes determining a recognition result for the low-reliability section based on the verified similarity and consistency.

9. The speech recognition method according to claim 7, wherein the meta-information is caption information.

* * * * *